US012356407B2

(12) United States Patent
Sridharan et al.

(10) Patent No.: US 12,356,407 B2
(45) Date of Patent: Jul. 8, 2025

(54) UPLINK CONTROL INFORMATION MULTIPLEXING OVER MULTIPLE SLOT TRANSMISSIONS

(71) Applicant: QUALCOMM Incorporated, San Diego, CA (US)

(72) Inventors: Gokul Sridharan, Sunnyvale, CA (US); Seyedkianoush Hosseini, San Diego, CA (US); Hung Dinh Ly, San Diego, CA (US); Yi Huang, San Diego, CA (US); Wei Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 17/656,211

(22) Filed: Mar. 23, 2022

(65) Prior Publication Data

US 2022/0322337 A1    Oct. 6, 2022

Related U.S. Application Data

(60) Provisional application No. 63/166,957, filed on Mar. 26, 2021.

(51) Int. Cl.
*H04W 72/21*     (2023.01)
*H04L 1/1812*    (2023.01)
*H04L 5/00*      (2006.01)
*H04W 72/0446*   (2023.01)

(52) U.S. Cl.
CPC ........... *H04W 72/21* (2023.01); *H04L 1/1812* (2013.01); *H04L 5/0053* (2013.01); *H04W 72/0446* (2013.01)

(58) Field of Classification Search
CPC .. H04W 72/21; H04W 72/0446; H04L 5/0053
See application file for complete search history.

(56) References Cited

U.S. PATENT DOCUMENTS

| 2016/0183244 | A1* | 6/2016  | Papasakellariou | H04L 5/001 370/329 |
| 2019/0306923 | A1* | 10/2019 | Xiong           | H04J 13/0062       |
| 2019/0349917 | A1* | 11/2019 | Huang           | H04W 72/21         |
| 2020/0404655 | A1* | 12/2020 | Salem           | H04W 72/23         |

FOREIGN PATENT DOCUMENTS

EP       2696548 A2 *   2/2014    ........... H04L 1/0031

OTHER PUBLICATIONS

"3rd Generation Partnership Project, Technical Specification Group Radio Access Network, NR, Multiplexing and Channel Coding (Release 16)", 3GPP Standard Technical Specification, 3GPP TS 38.212, Dec. 2020, V16.4.0,. 146 Pages, sections 6.2.5, 6.3.2.4.1.

\* cited by examiner

*Primary Examiner* — Samina F Choudhry
(74) *Attorney, Agent, or Firm* — Procopio, Cory, Hargreaves & Savitch LLP

(57) ABSTRACT

A method, a computer-readable medium, and an apparatus are provided for wireless communication. The apparatus multiplexes uplink control information (UCI) in a segment of a multiple slot physical uplink shared channel (PUSCH) transmission, the UCI multiplexing being based on at least one of a slot within a multiple slot transmission occasion, a segment of the multiple slot transmission occasion, or the multiple slot transmission occasion. The apparatus transmits the multiple slot PUSCH transmission with multiplexed UCI.

33 Claims, 24 Drawing Sheets

UPLINK CONTROL INFORMATION MULTIPLEXING OVER MULTIPLE SLOT TRANSMISSIONS

CROSS REFERENCE TO RELATED APPLICATION(S)

This application claims the benefit of and priority to U.S. Provisional Application Ser. No. 63/166,957, entitled "Uplink Control Information Multiplexing Over Multiple Slot Transmissions" and filed on Mar. 26, 2021, which is expressly incorporated by reference herein in its entirety.

TECHNICAL FIELD

The present disclosure relates generally to communication systems, and more particularly, to wireless communication include uplink control information (UCI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus multiplexes uplink control information (UCI) in a segment of a multiple slot physical uplink shared channel (PUSCH) transmission, the UCI multiplexing based on at least one of: a slot within a multiple slot transmission occasion, a segment of the multiple slot transmission occasion, or the multiple slot transmission occasion. The apparatus transmits the multiple slot PUSCH transmission with multiplexed UCI.

In an aspect of the disclosure, a method, a computer-readable medium, and an apparatus are provided for wireless communication at a network entity. The apparatus allocates resources to a UE for a multiple slot PUSCH transmission. The apparatus receives the multiple slot PUSCH transmission comprising UCI multiplexed in a segment of the multiple slot PUSCH transmission, the UCI multiplexed based on at least one of: a slot within a multiple slot transmission occasion, a segment of the multiple slot transmission occasion, or the multiple slot transmission occasion.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
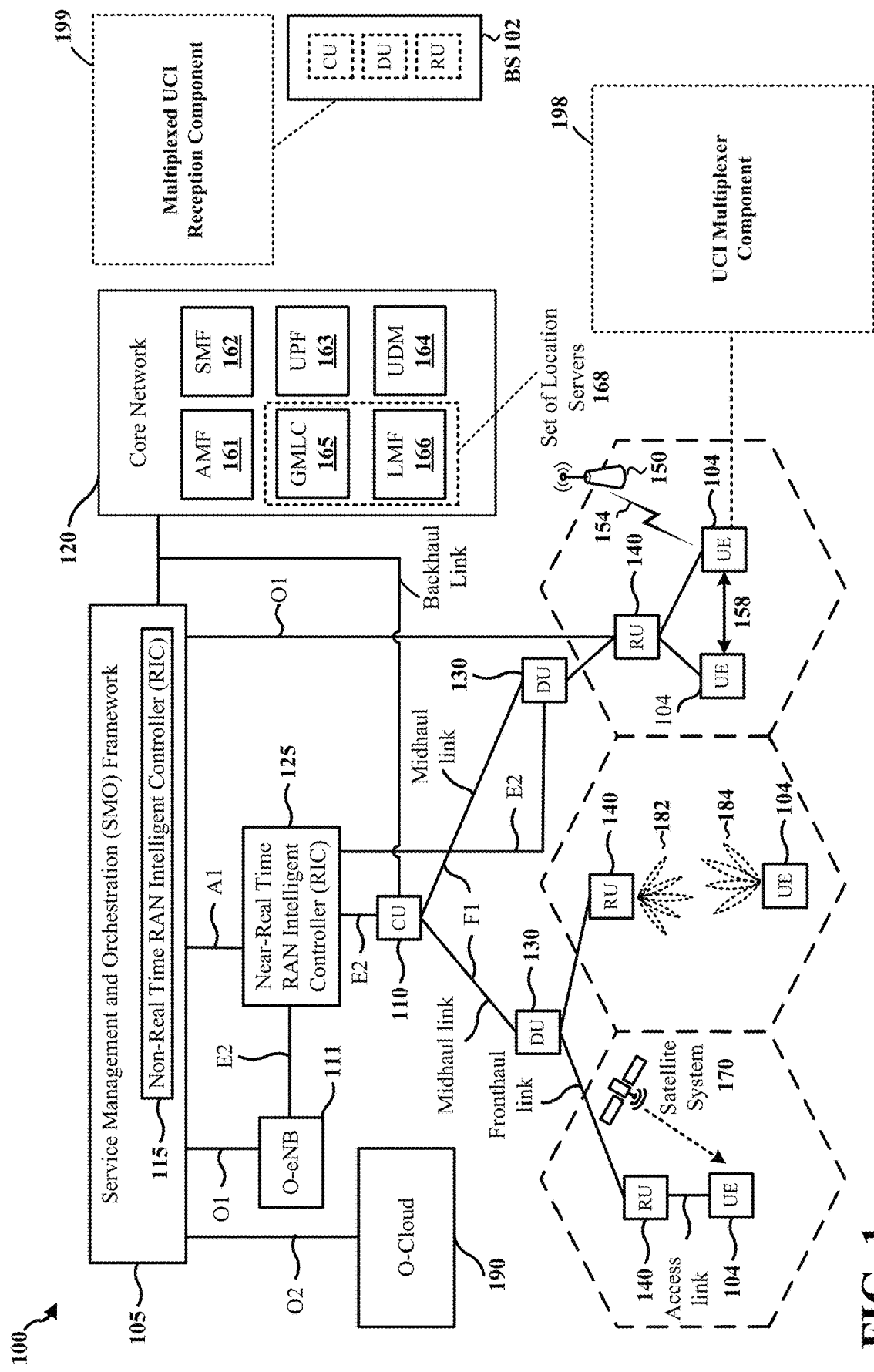
FIG. 1 is a diagram illustrating an example of a wireless communications system and an access network.

A UE may transmit a PUSCH over a transmission occasion spanning multiple slots. The UE may transmit a single TB within the multiple slots of the transmission occasion. At times, the UE may have uplink control information (UCI) for transmission in a physical uplink control channel (PUCCH) that overlaps in time with the transmission occasion for the PUSCH. Based on the overlap in time, the UE may multiplex the UCI with the PUSCH. Aspects presented herein provide various ways for the UE to multiplex the UCI with the multiple slot PUSCH. The multiplexing aspects including any combination of the number of resources for the UCI, the location for the UCI, the handling of the multiplexing, timelines, the rate matching of the PUSCH, and/or the interleaving of the PUSCH may vary based on a type of transmission occasion (e.g., contiguous or non-contiguous. The multiplexing aspects may vary based on the slot of the PUSCH transmission occasion that is overlapped. The multiplexing aspects may vary based on the type of PUSCH handling, e.g. per slot, per transmission occasion, or per segment interleaving and RV cycling.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs.

Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite system 170 (e.g., one or more of a Global Navigation Satellite System (GNSS), satellite positioning system (SPS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

As described herein, a UE 104 may include a UCI multiplexer component 198. In some aspects, the UCI multiplexer component 198 may be configured to multiplex UCI in a segment of a multiple slot PUSCH transmission. A segment may correspond to at least one slot. In some aspects, a segment may correspond to a slot. The UE 104 may be configured to transmit the multiple slot PUSCH transmission with the multiplexed UCI. The base station 102 may include a multiplexed UCI reception component 199. The base station 102 may allocate resources to the UE 104 for a multiple slot PUSCH transmission. In some aspects, the multiplexed UCI reception component 199 may be configured to receive the multiple slot PUSCH transmission comprising UCI multiplexed in at least one slot of the multiple slot PUSCH transmission. Although the following description may be focused on 5G NR, the concepts described herein may be applicable to other similar areas, such as LTE, LTE-A, CDMA, GSM, and other wireless technologies.

Figure 2:
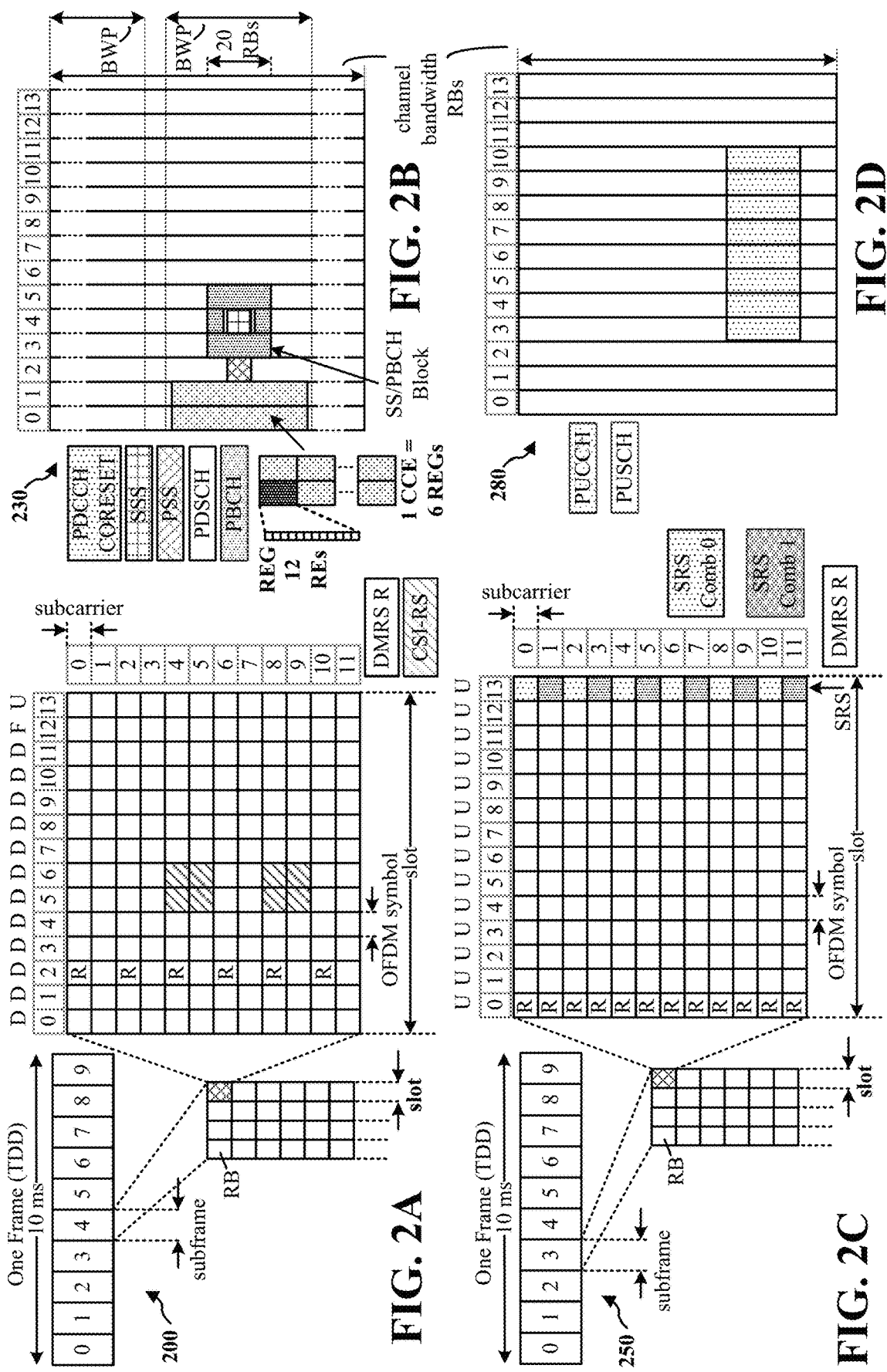
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
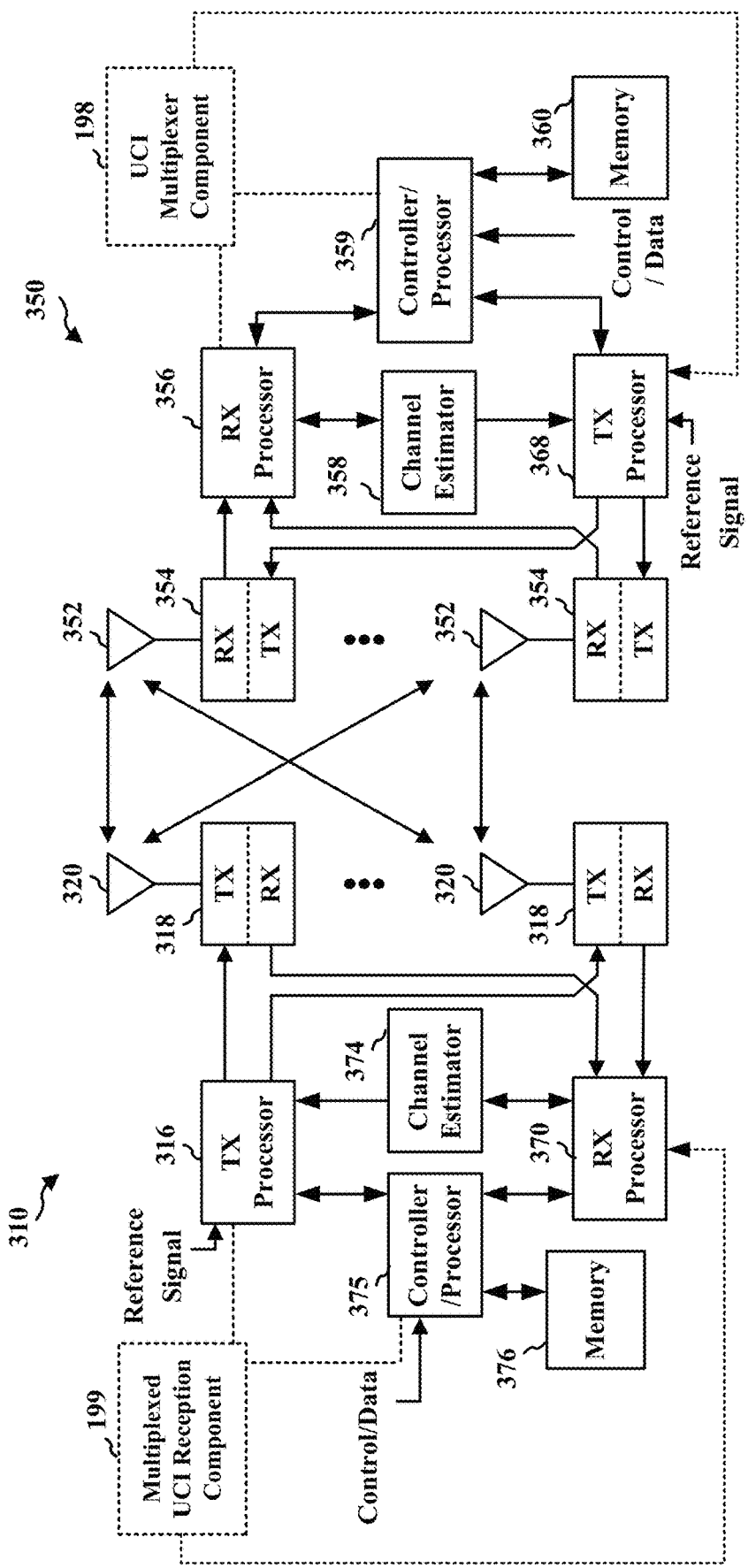
FIG. 3 is a diagram illustrating an example of a base station and user equipment (UE) in an access network.

FIG. 3 is a block diagram of a base station 310 in communication with a UE 350 in an access network. In the DL, IP packets from the EPC may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC. The controller/processor 375 is also responsible for error detection using an ACK and/or NACK protocol to support HARQ operations.

At least one of the TX processor 368, the RX processor 356, and the controller/processor 359 may be configured to perform aspects in connection with the UCI multiplexer component 198 of FIG. 1.

At least one of the TX processor 316, the RX processor 370, and the controller/processor 375 may be configured to perform aspects in connection with the multiplexed UCI reception component 199 of FIG. 1.

Figure 4:
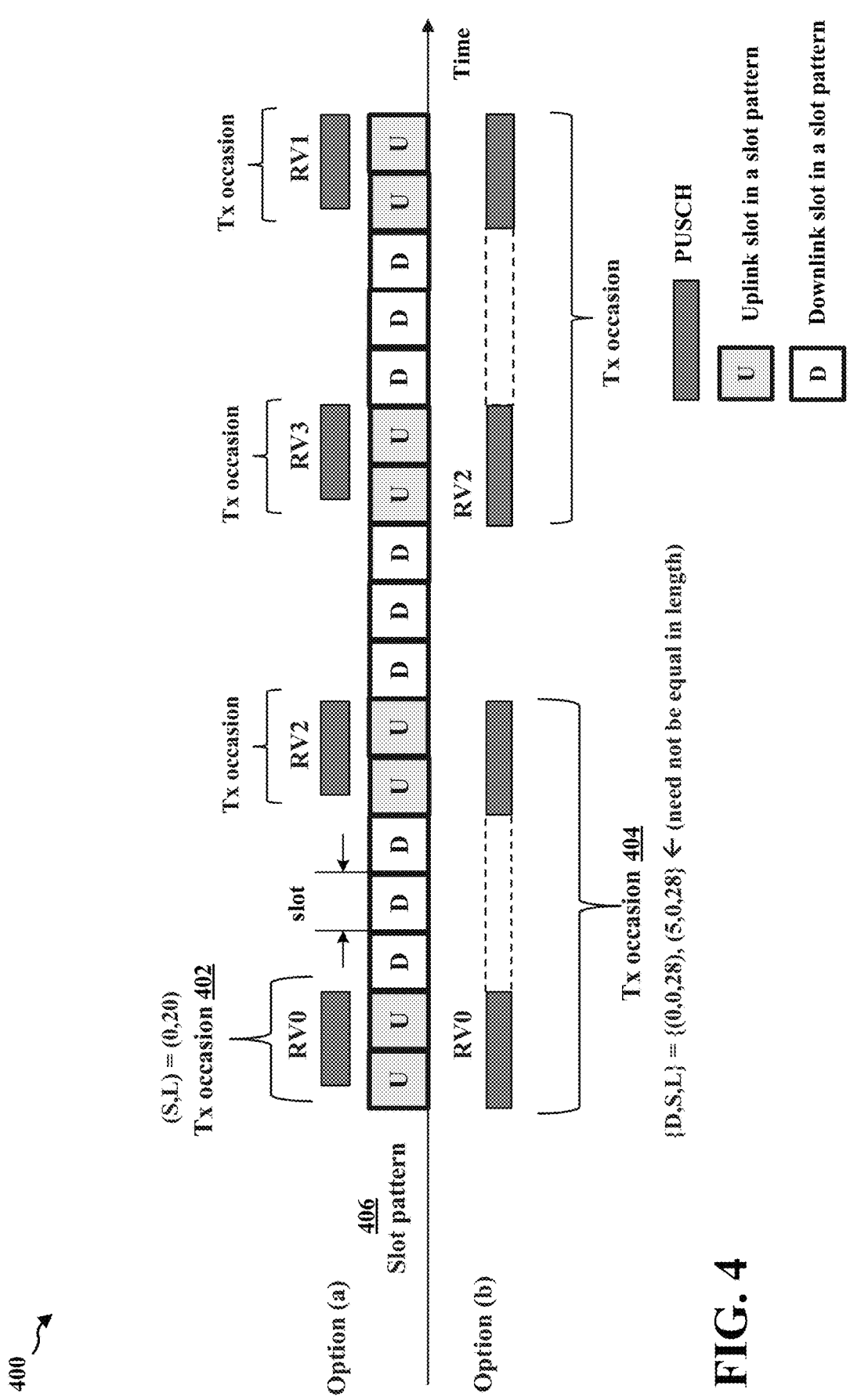
FIG. 4 illustrates a diagram showing various options of transmission occasions for multiple slot PUSCH transmissions.

A PUSCH may be transmitted across multiple slots as a multiple slot PUSCH transmission. The PUSCH transmission may span multiple transmission occasions. The transmission occasion may include uplink resources, e.g., uplink slots, with resources allocated to the UE for transmission of the PUSCH. FIG. 4 illustrates a diagram 400 showing two different options for multiple slot PUSCH transmissions. FIG. 4 also illustrates an example slot pattern 406, e.g., a TDD uplink/downlink slot pattern. In a first option, e.g., shown as option (a) in FIG. 4, each transmission occasion of the multiple slot PUSCH transmission includes contiguous resources (e.g., contiguous symbols or contiguous slots) spanning one or more slots, e.g., as shown for transmission occasion 402. In some aspects, the contiguous resources may include contiguous symbols that extend into two different slots. FIG. 4 illustrates that the contiguous resources of each transmission occasion may be separated by resources that are not part of the PUSCH transmission, such as downlink slots. In a second option, e.g., shown as option (b) in FIG. 4, each transmission occasion may include non-contiguous resources. The non-contiguous resources may include multiple sets of contiguous resources, as shown for the transmission occasion 404.

A time domain resource allocation (TDRA) of a multiple slot PUSCH transmission occasion provides the set of consecutive or nonconsecutive symbols of the transmission occasion. For a transmission occasion of contiguous resources, e.g., option (a) in FIG. 4, the TDRA may be indicated as a pair of a starting symbol (S) for the contiguous resources and a length (L) of the contiguous resources of the transmission occasion, e.g., a pair (S,L). FIG. 4 illustrates an example of (S,L)=(0,20) to illustrate the concept. S=0 may correspond to a first symbol of an uplink slot of an uplink grant, and L=20 may correspond to a length of 20 symbols. For a transmission occasion of non-contiguous resources, e.g., option (b) in FIG. 4, the TDRA may be indicated as a triplet of (D, S, L), wherein D further indicates a slot index relative to a reference slot. The reference slot may be the slot in which the UE receives the DCI with the uplink grant from the base station. The reference slot may be a slot indicated by the DCI as a beginning of the transmission occasion, which may be referred to by a parameter K2. FIG. 4 illustrates an example of (D,S,L)={(0,0,28), (5,0,28)} to illustrate the concept. In the first triplet, D=0 may indicate that the transmission occasion begins 0 slots from the reference slot, S=0 indicates a first symbol of the slot as the starting symbol, and L=28 indicates a length of 28 symbols. In the second triplet, D=5 may indicate that the transmission occasion begins 5 slots from the reference slot, S=0 indicates a first symbol of the slot as the starting symbol, and L=28 indicates a length of 28 symbols. Thus, the first triplet indicates a first set of contiguous resources, and the second triplet indicates a second set of contiguous resources, the first and second set of contiguous resources being non-contiguous with each other. L may be the same in both triplets, as in this example. In other aspects, the sets of contiguous resources that form the non-contiguous resources of the transmission occasion may have different lengths.

Figure 5A:
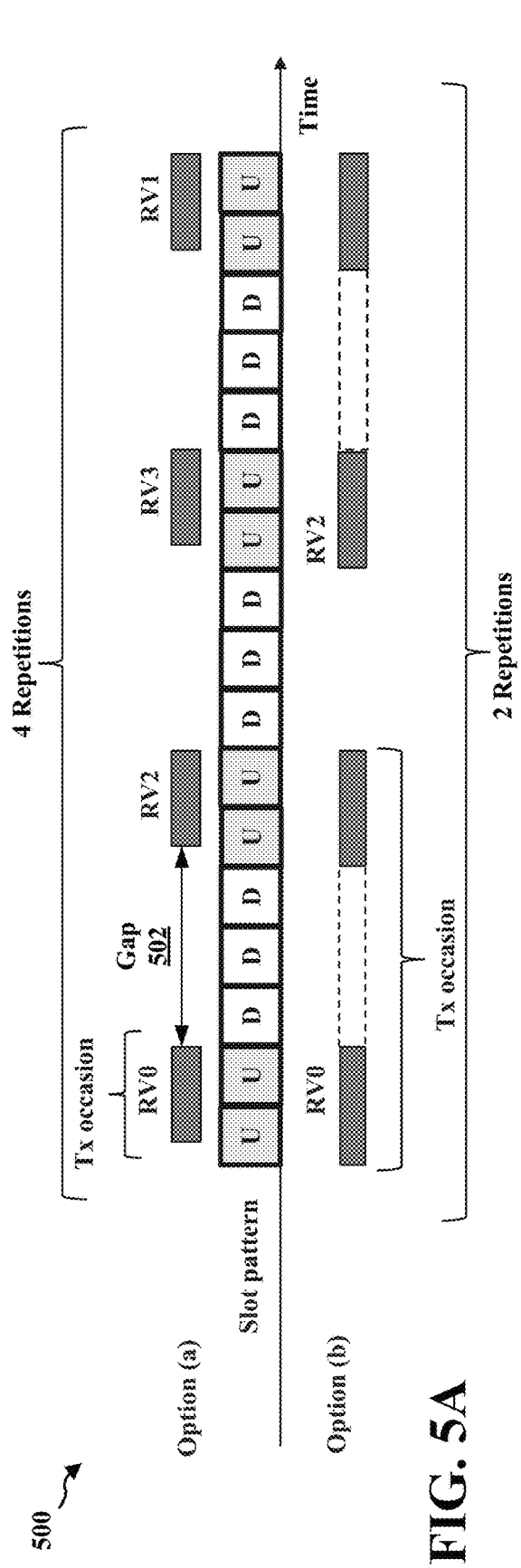
FIGS. 5A and 5B illustrate example aspects of redundancy version (RV) cycling for multiple transmissions occasions of a multiple slot PUSCH.

A single transport block (TB) of the PUSCH may be transmitted in a transmission occasion. If repetitions are allowed, the TB may be transmitted over multiple transmission occasions. Thus, multiple slot PUSCH repetitions may occur over a set of transmission occasions, with each repetition of the TB being transmitted within a single transmission occasion. FIG. 5A illustrates an example of four repetitions of the PUSCH TB in four transmission occasions of contiguous resources according to option (a) and an example of two repetitions of the PUSCH TB in two transmission occasions including non-contiguous sets of resources according to option (b). In some aspects, a repetition factor may be indicated by the base station to the UE, e.g., along with the TDRA for the multiple slot PUSCH transmission. The repetition factor may indicate an amount repetition to the UE. In some aspects, along with the TDRA, the base station may indicate to the UE a periodicity or an offset parameter that may indicate to the UE a spacing for the repetitions. For example, the base station may indicate an inter-repetition gap in symbols or slots. FIG. 5A illustrates an example gap 502 between repetitions for option (a). The gap may indicate a separation in time between the end of one transmission occasion and the beginning of a next transmission occasion or may indicate a separation in time between a beginning of one transmission occasion and a beginning of a next transmission occasion, for example.

Figure 5B:
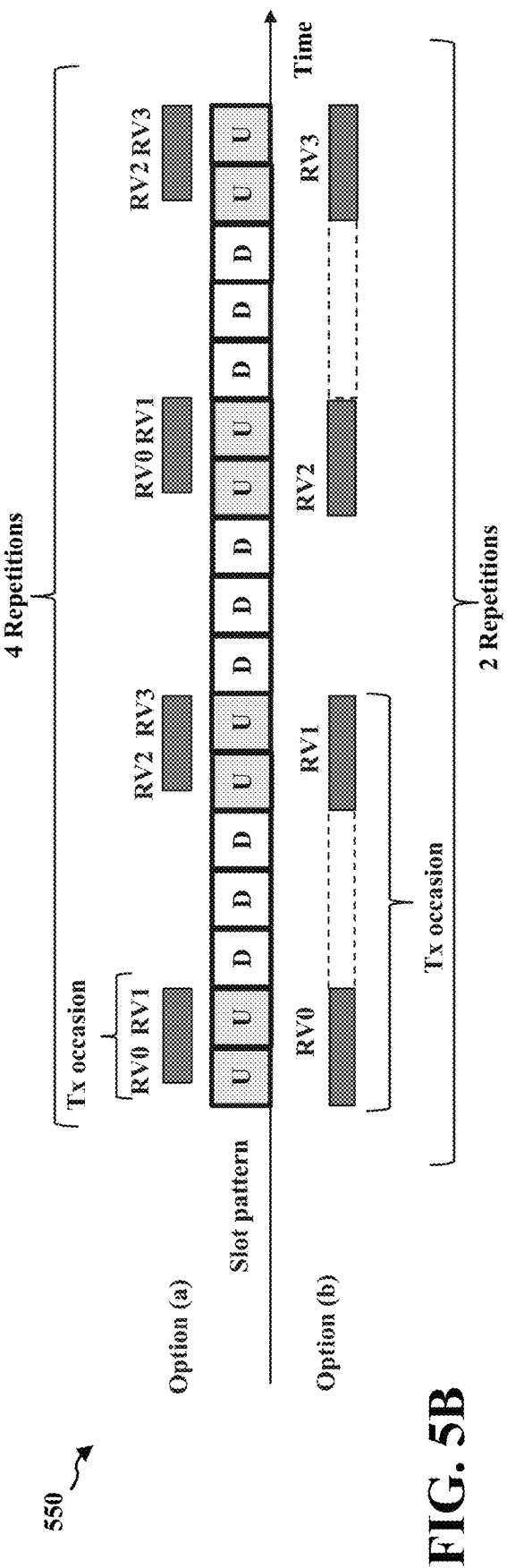

FIGS. 5A and 5B illustrate different examples of redundancy version (RV) cycling over repetitions of a TB transmitted as a multiple slot PUSCH transmission. The examples in FIGS. 5A and 5B may correspond to the same source payload for the TB and show that the same source payload may be encoded differently across the resources of a transmission occasion. In the diagram 500 in FIG. 5A, the RV is refreshed, e.g., changed, between transmission occasions, e.g., at gap 502. In FIG. 5A, RV0 is applied to the contiguous resources of a first transmission occasion. The RV index is changed to RV2 at the subsequent transmission occasion. The RV index is then changed to RV3 and RV1 for the following transmission occasions. Similarly, for the transmission occasions of non-contiguous resource sets in option (b), the RV index is similarly maintained across the non-contiguous resource sets of a single transmission occasion and is changed, or refreshed, for a following transmission occasion. The examples are shown for a transmission of a TB over a single transmission occasion. Thus, the RV cycles over repetitions of the TB in different transmission occasions.

FIG. 5B illustrates a diagram 550 in which the RV may be cycled within individual transmission occasions rather than between transmission occasions, as in FIG. 5A. As shown for option (b) in FIG. 5B, a single RV index may be used over a set of contiguous symbols of a non-contiguous transmission occasion and may be changed to a different RV index at a subsequent set of contiguous symbols within the same transmission occasion. Thus, the RV may refresh, or change, at the gap between contiguous resources of a single transmission occasion. As shown for option (a) in FIG. 5B, a single RV index may be used over symbols of a single slot, and a different RV index may be applied to the symbols of a subsequent slot of the transmission occasion. Thus, the RV may refresh, or change, at a slot boundary of a single transmission occasion.

Aspects presented herein may be applied for a multiple slot PUSCH transmission with a single codebook. In some examples, the aspects presented herein may be applied for a multi-codebook PUSCH transmission. However, the multi-codebook PUSCH transmission may provide less gain compared to the single codebook implementation. In some aspects, a TB size may range from approximately 100 bits to 1000 bits, although aspects may similarly be applied to TB sizes that are smaller than or larger than the range.

When a UE transmits a PUSCH spanning multiple slots, the UE may know/store a state of transmission across slots. In some aspects, the state may refer to a state of a last transmitted bit. If the UE interleaves the PUSCH transmission, it may be challenging for the UE to transmit a PUSCH across slots or across non-contiguous symbols. For example, the UE may use information about how much of the interleaved sequence was transmitted and/or may store the untransmitted sequence. In order to simplify the operations of the UE, the UE may apply interleaving within a slot, for example.

Figure 6:
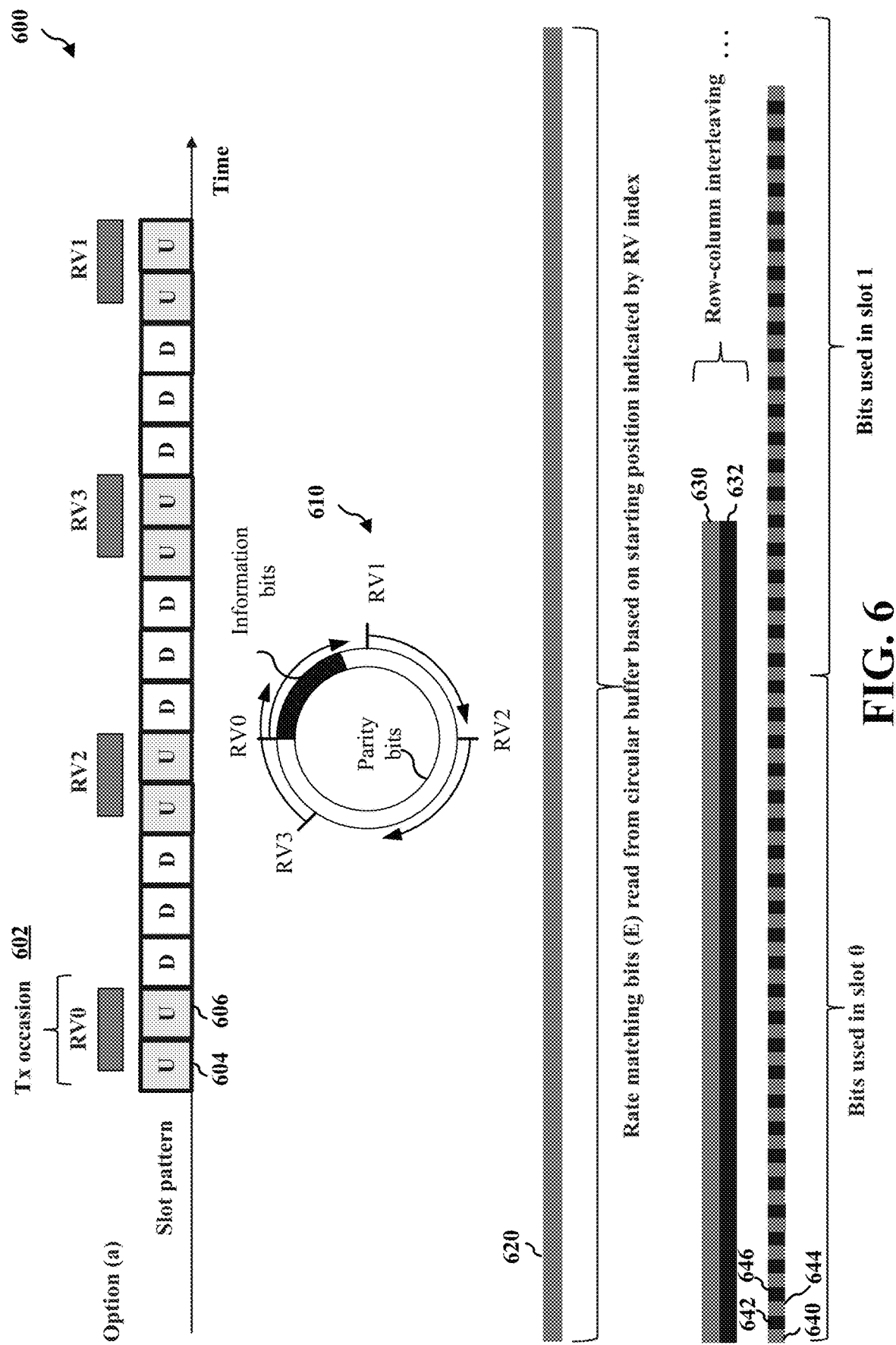
FIG. 6 illustrates example aspects of transmission occasion based interleaving for a multiple slot PUSCH transmission.
Figure 7:
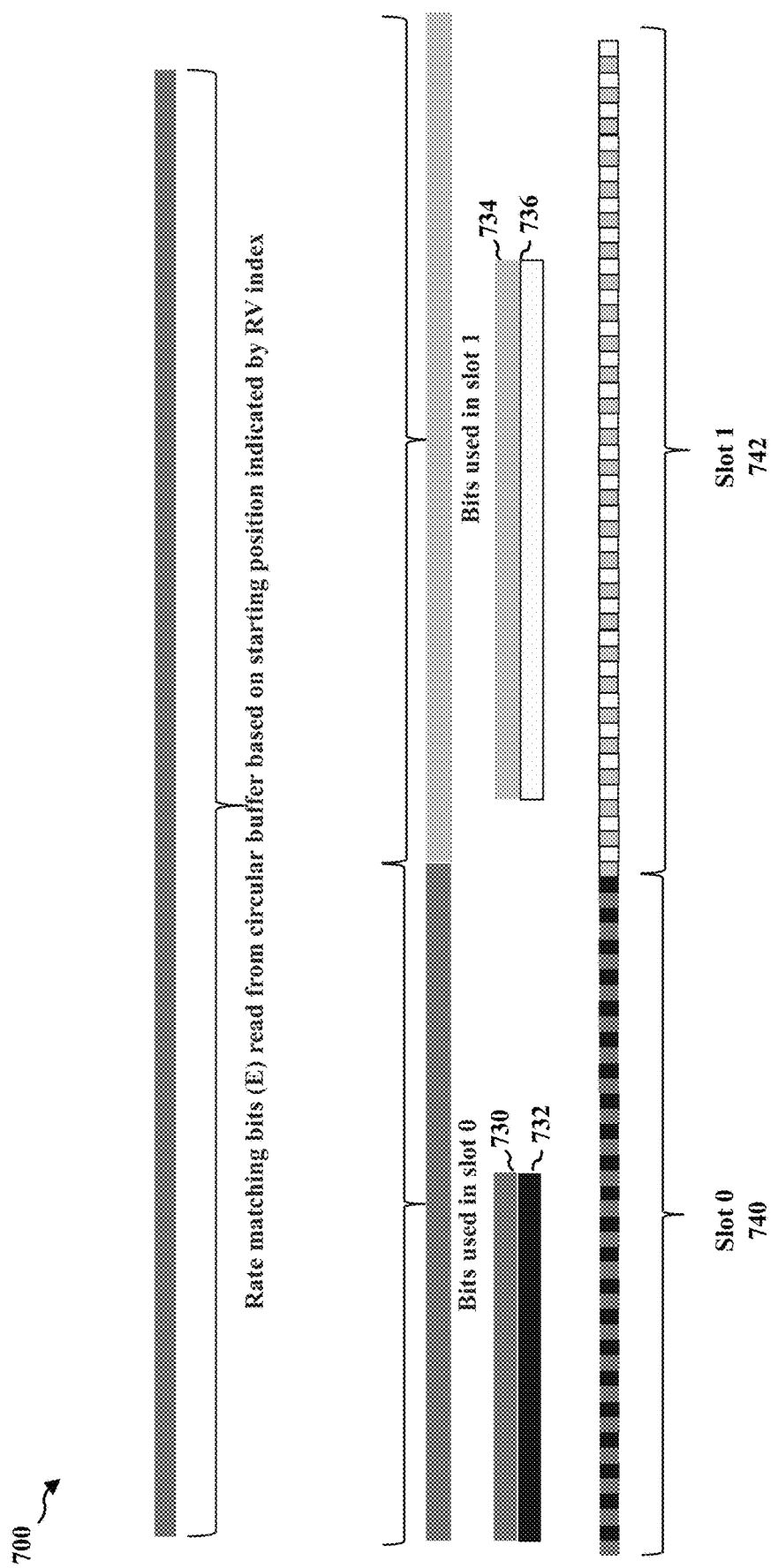
FIG. 7 illustrates example aspects of slot based interleaving for a multiple slot PUSCH transmission.

FIG. 6 illustrates a diagram 600 showing example aspects of interleaving a TB for transmission of a multiple slot PUSCH. FIG. 6 shows a pattern of transmission occasions of contiguous resources, e.g., similar to option (a) in FIG. 4. The TB may be transmitted within a single transmission occasion, such as in slot 0 604 and slot 1 606 of the transmission occasion 602. The UE may read the information bits of the TB from a circular buffer based on a starting position indicated by an RV index, e.g., as shown at 610. The information bits of the TB may start at RB0, for example. The rate matching bits that have been read from the circular buffer are illustrated at 620. Rate matching may include a process in which the number of encoded bits that can be transmitted on the available resources for a PUSCH transmission is determined. For example, a total number of bits may equal the total number of available REs multiplied by a modulation order. Then, the determined number of encoded bits may be read from the circular buffer. "Rate matching bits" as used herein refers to encoded bits selected for transmission based on rate matching requirements and/or principles. The amount of bits may be selected based on the amount of bits for rate matching the TB within the transmission occasion 602, in some aspects. After reading out the bits, the UE may apply interleaving to the bits. For example, channel coding processing for the PUSCH transmission may include a bit-level interleaver for each CB of the TB. FIG. 6 illustrates an example of row-column interleaving in which the bits may be organized, e.g., read into or placed into, multiple columns. FIG. 6 illustrates a first row 630 and a second row 632. The bits are then read from the two rows (e.g., 630, 632) based on column. Thus, a bit from a first column of row 630 corresponds to bit 640 for transmission in slot 0. A bit from the first column of row 632 corresponds to bit 642 for transmission in slot 0. The process continues to the bit in the second column of row 630 being placed at 644 followed by the bit in the second column of row 632 being placed at 646, and so forth. The bits for rate matching across an entire transmission occasion may be interleaved and transmitted, as shown in FIG. 6, which shows the interleaving applied across slot 0 and slot 1 of the transmission occasion 602. In other aspects, the bits for rate matching may be selected per slot and may be interleaved per slot before transmission, such as illustrated in FIG. 7. FIG. 7 illustrates a diagram 700 showing that the bits for slot 0 may be read into row 730 and row 732, whereas the bits for slot 1 may be read into row 734 and 736. Then, the bits for slot 0 are read in a column manner from the rows 730 and 732 to form a slot-based interleaved pattern 740 for slot 0, and the bits for slot 1 are read in a column manner from rows 734 and 736 to form a slot-based interleaved pattern 742 for slot 1.

Figure 8:
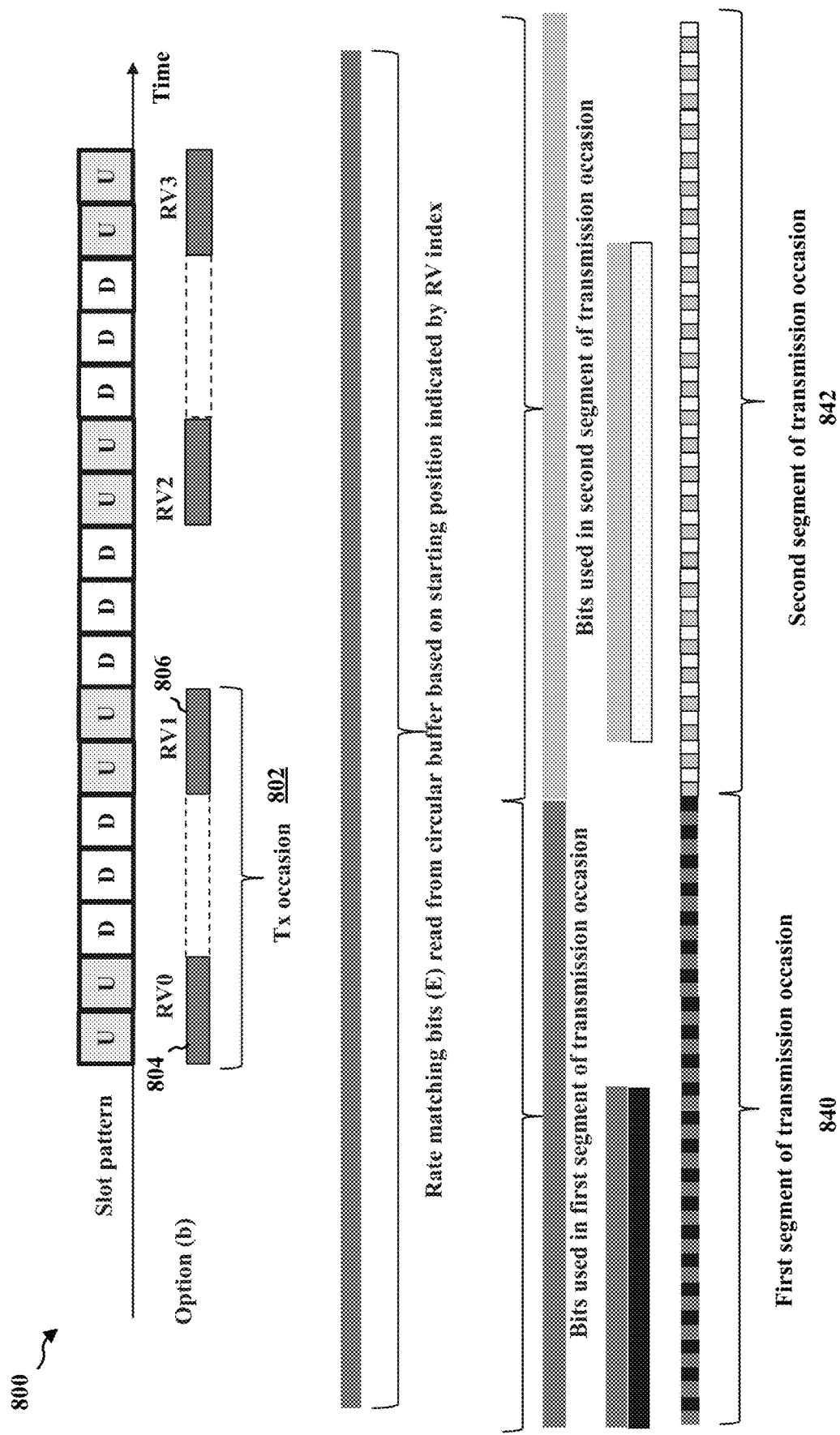
FIG. 8 illustrates example aspects of segment based interleaving for a multiple slot PUSCH transmission in a transmission occasion having non-contiguous segments of resources.

FIGS. 6, 7, and 8 are based on an entire TB being encoded in a single code block (CB). A TB may be encoded across multiple CBs. When an entire TB is encoded using a single CB, the encoded bits (in the circular buffer) for the transmission can be chosen on a per-slot basis or a per-TO basis.

These chosen bits are called rate-matched bits. The interleaver operates on the rate-matched bits. When the rate-matched bits are chosen at once for the entire TO, the interleaver spans across the entire TO. When the rate-matched bits are chosen per slot, the interleaver spans a single slot. When the rate-matched bits are chosen on a per slot basis, multiple sets of rate-matched bits will be selected and individually interleaved so that the resources across the entire TO are used.

The example in FIG. 6 may be applied for transmission occasion based rate matching and interleaving for non-contiguous resources of a single transmission occasion, such as in option (b) of FIG. 4. Rather than the bits being for slot 0 and slot 1, as in FIG. 6, the bits may be for non-contiguous slots that are comprised in the same transmission occasion. FIG. 8 illustrates a diagram 800 of an example of segment based rate matching and interleaving for non-contiguous resources of a single transmission occasion, such as in option (b) shown in FIG. 8. FIG. 8 illustrates the transmission occasion 802 including a first segment 804 of contiguous resources and a second segment 806 of contiguous resources. Rather than being rate matched and interleaved per slot, as in FIG. 7, the bits may be read out for rate matching and interleaving, such as row-column interleaving, to obtain the interleaved bits 840 of the first segment of contiguous resources (e.g., 804) and the interleaved bits 842 of the second segment of contiguous resources (e.g., 806).

Thus, in a first option, the rate matching and interleaving may be applied to bits across an entire transmission occasion, as illustrated in FIG. 6, which may be referred to as transmission occasion based rate matching and interleaving or may be referred to as rate matching and interleaving across a transmission occasion. Thus, the bits may be selected, read, or otherwise input, for a transmission occasion. The bits for the transmission occasion may then be rate matched and interleaved and transmitted by the UE. In a second option, the bits may be selected per slot, and the interleaving may be applied to the bits for the slot, as shown in FIG. 7, which may be referred to as slot based interleaving, interleaving per slot, or interleaving across a slot. Thus, the bits may be selected, read, or otherwise input for a slot. The bits for the slot may then be interleaved and transmitted by the UE. In a third option, the bits may be selected per segment of a transmission occasion with non-contiguous segments, and the interleaving may be applied to the bits for a respective segment, as shown in FIG. 8, which may be referred to as segment based interleaving, interleaving per segment, or interleaving across a segment. Thus, the bits may be selected, read, or otherwise input for a segment. The bits for the segment may then be interleaved and transmitted by the UE.

If the UE rate matches and interleaves the bits per slot, as in FIG. 7, the UE may use a starting position within the circular buffer for each slot. The UE may not need to buffer the interleaved bits, and may instead preserve the circular buffer. The per slot rate matching and interleaving may provide an improved timeline, resource management, and/or memory management for the UE. In some aspects, UCI may be multiplexed with PUSCH. UCI multiplexing may be considered on a per slot basis, e.g., based on an overlap between the slot in which the UCI is to be transmitted and the slot in which the PUSCH is to be transmitted. In some aspects, the timeline may be tied to a different reference point than the beginning of the multiple slot PUSCH transmission.

For rate matching and interleaving bits per segment, as illustrated in the example in FIG. 8, the UE may remember a starting position within the circular buffer for each segment, e.g., without buffering interleaved bits, similar to the slot based interleaving.

If the UE rate matches and interleaves bits across a transmission occasion, e.g., as in FIG. 6, performance may be improved because system bits may occupy more reliable positions within the transmission occasion.

UCI multiplexing per slot may be easier when rate matching and interleaving per slot in comparison to rate matching and interleaving bits across a transmission occasion or a segment of a transmission occasion.

In some aspects, a UE may have UCI for transmission at a time that overlaps with a multiple slot PUSCH transmission. The UE may multiplex the UCI with the PUSCH transmission. The UCI may be scheduled within a slot, and the PUSCH may extend across multiple slots. Aspects presented herein enable the UE to determine how many resources allocated for the PUSCH to use for the UCI, the location for the UCI within the PUSCH, encoding and rate matching for the PUSCH with the multiplexed UCI, etc.

Figure 9:
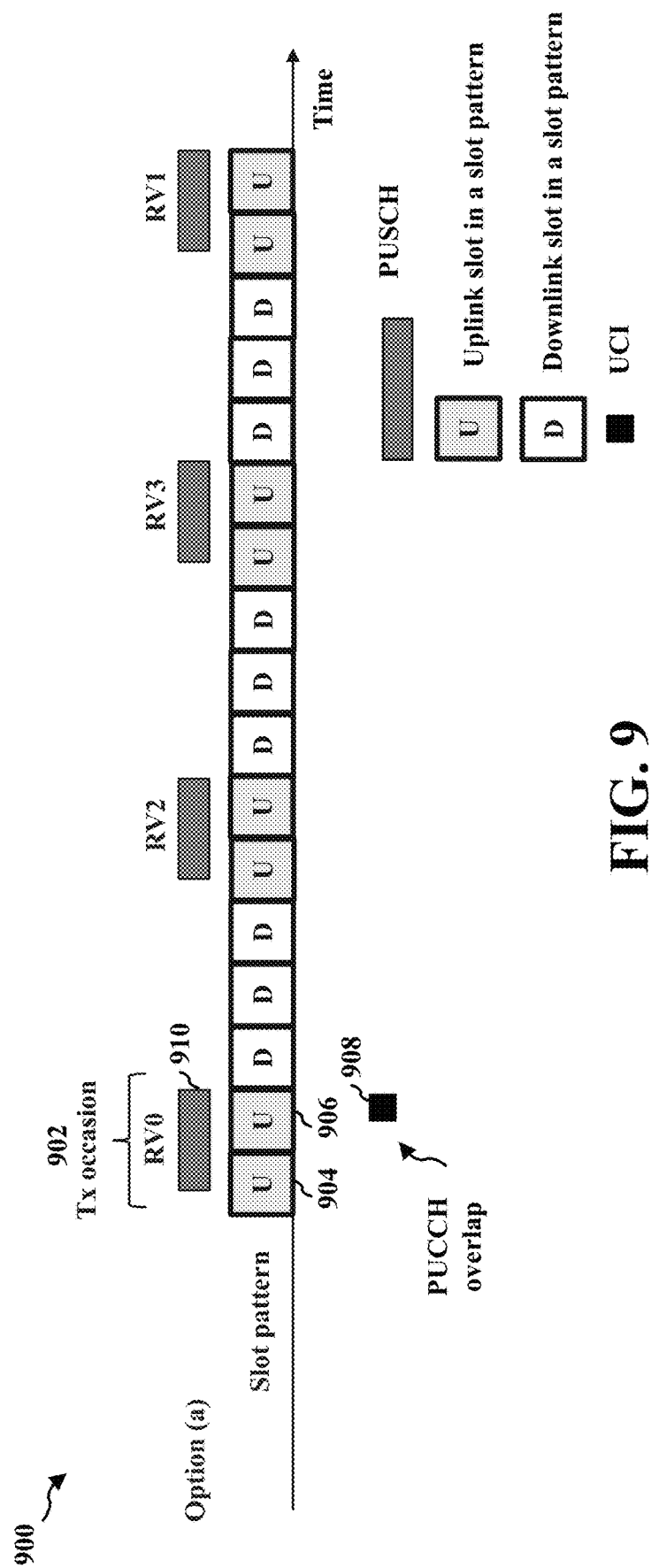
FIG. 9 illustrates an example of UCI overlapping in time with a transmission occasion for a multiple slot PUSCH transmission, the transmission occasion having contiguous resources.

FIG. 9 illustrates an example 900 of a transmission occasion 902 having contiguous resources (e.g., resources in slot 904 and slot 906), similar to option (a) in FIG. 4. FIG. 9 also illustrates a PUCCH overlap of UCI 908 with slot 906 of the PUSCH 910. As presented herein, an overlap between the PUSCH and the PUCCH may be handled independently per transmission occasion of the PUSCH. The UCI may include various types of information. In some aspects, the UCI may include ACK/NACK information, e.g., HARQ feedback, for a PDSCH received from the base station. In other aspects, the UE may receive and measure CSI-RS from the base station, and may have a CSI report to transmit as UCI to the base station.

For each transmission occasion in which one of the multiple slots of the contiguous resources of the transmission occasion are overlapped in time with PUCCH resources for the transmission of UCI, the UE may consider whether to multiplex the PUCCH, e.g., the UCI, in the resources of the transmission occasion.

The UE may consider whether to multiplex the UCI of the PUCCH within the slot of the overlap, e.g., and not within other slots of the transmission occasion. In some aspects, the timeline for multiplexing the UCI may be based on the slot of the overlap, e.g., slot 906 in FIG. 9. In other aspects, the timeline for multiplexing the UCI may be based on the start of the transmission occasion 902.

The UE may consider whether to multiplex the UCI of the PUCCH over the transmission occasion, e.g., rather than limited to a slot of overlap with the UCI. The timeline for multiplexing the UCI may be based on the start of the transmission occasion 902.

Table 1 illustrates an example of various scenarios (e.g. examples 1-5) that show various combinations of considerations for multiplexing UCI with a contiguous resource transmission occasion (e.g., option (a) of FIG. 4) of a multiple slot PUSCH transmission.

TABLE 1

| | Overlapping Slot | Multiplexing slot/TO | PUSCH Handling | Timeline |
|---|---|---|---|---|
| Ex. 1 | Slot 0 | Slot 0 | Per-slot rate matching and interleaving<br>Or<br>Per-slot RV cycling<br>Or<br>Per-TO rate matching and interleaving<br>Or<br>Per-TO RV cycling | Slot0-based |
| Ex. 2 | Slot 0 | Entire TO | Per-slot rate matching and interleaving<br>Or<br>Per-slot RV cycling<br>Or<br>Per-TO rate matching and interleaving<br>Or<br>Per-TO RV cycling | Slot0-based |
| Ex. 3 | Slot 1 | Slot 1 | Per-slot rate matching and interleaving<br>Or<br>Per-slot RV cycling | Slot1-based |
| | Slot 1 | Slot 1 | Per-TO rate matching and interleaving<br>Or<br>Per-TO RV cycling | Slot0-based |
| Ex. 4 | Slot 1 | Entire TO | Per-slot rate matching and interleaving<br>Or<br>Per-slot RV cycling<br>Or<br>Per-TO rate matching and interleaving<br>Or<br>Per-TO RV cycling | Slot0-based |
| Ex. 5 | Slot X | Repeat in each slot | Per-slot rate matching and interleaving<br>Or<br>Per-slot RV cycling<br>Or<br>Per-TO rate matching and interleaving<br>Or<br>Per-TO RV cycling | Slot0-based |

Figure 10:
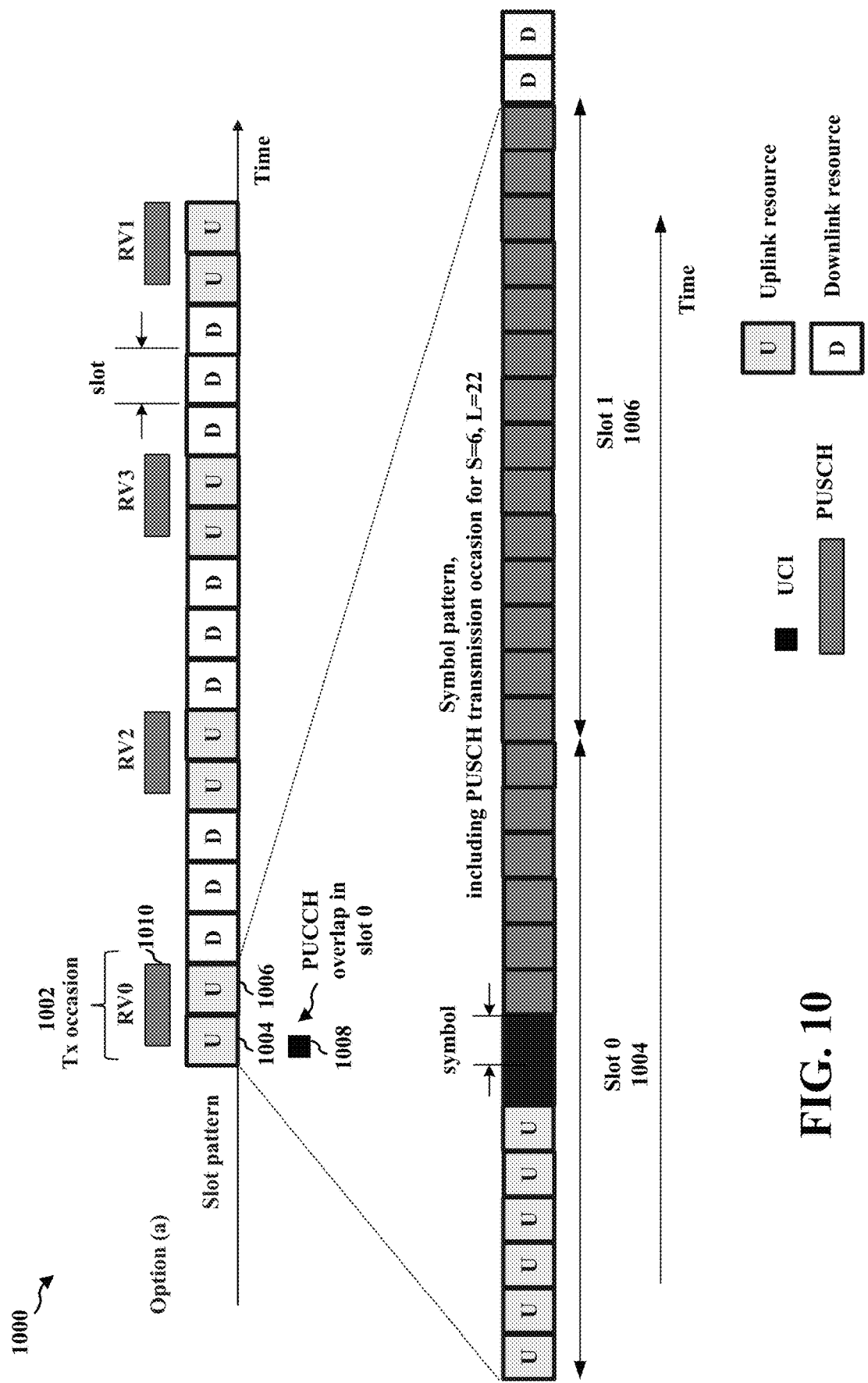
FIG. 10 illustrates an example of multiplexing UCI in an overlapped slot of a transmission occasion for a multiple slot PUSCH transmission, the transmission occasion having contiguous resources.

FIG. 10 illustrates an example diagram 1000 of example 1 from Table 1, in which the UCI 1008 overlaps in slot 0 (e.g., slot 1004) of transmission occasion 1002 having contiguous resources in slots 1004 and 1006. The UCI overlaps in slot 0 and is multiplexed in slot 0 of the transmission occasion 1002. FIG. 10 illustrates that the resources of the UCI may be comprised within a single slot, e.g., slot 0 1004. Slot 0 may also include other transmissions in symbols of the slot. For example, the UCI may be transmitted following transmission of DMRS.

In the example in FIG. 10, the UE may determine the resources for the UCI transmission based on the resources available in slot 0 1004. The UE may apply a beta factor on top of resources available for PUSCH transmission in slot 0 1004. For a single slot PUSCH, the UE may determine a number of REs that are potentially available for the UCI transmission across the PUSCH symbols in which the UCI may be multiplexed, divided by the number of REs by the total number of PUSCH bits.

In contrast, for a multiple slot PUSCH transmission based on the example in FIG. 10, the UE may instead determine the number of REs that are potentially available for the UCI across the PUSCH symbols in the particular slot (e.g., slot 0 1004) of a transmission occasion divided by the total number of PUSCH bits after scaling with a factor based on a number of symbols in slot 0 divided by a total number of PUSCH symbols in the transmission occasion.

As an example, for UCI that includes HARQ-ACK bits on a single slot PUSCH, the UE may determine the number of coded modulation symbols per layer for HARQ-ACK transmission, denoted as $Q'_{ACK}$, as follows:

$$Q'_{ACK} = \min\left\{ \left\lceil \frac{(O_{ACK} + L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil \right\}$$

Equation 1

In this example of equation 1, $O_{ACK}$ is the number of HARQ-ACK bits, and $L_{ACK}$ is the number of CRC bits for HARQ-ACK. $M^{PUSCH}_{sc}$ is the scheduled bandwidth of the PUSCH transmission, expressed as a number of subcarriers. $M^{UCI}_{sc}(l)$ is the number of resource elements that can be used for transmission of UCI in OFDM symbol l, for l=0, 1, 2, . . . , $N^{PUSCH}_{symball}-1$, in the PUSCH transmission and $N^{PUSCH}_{symball}$ is the total number of OFDM symbols of the PUSCH, including all OFDM symbols used for DMRS $M^{PT-RS}_{sc}(l)$ is the number of subcarriers in OFDM symbol l that carries PTRS, in the PUSCH transmission. $\alpha$ is configured by higher layer parameter, e.g., a scaling parameter. In this example, $l_0$ is the symbol index of the first OFDM symbol that does not carry DMRS of the PUSCH, after the first DMRS symbol(s), in the PUSCH transmission. $\beta^{PUSCH}_{offset}$ is a beta offset.

Thus, in this single slot PUSCH example, $$\sum_{r=0}^{C_{UL-SCH}-1} K_r$$

in equation 1 may correspond to a total number of PUSCH bits, and $$\sum_{l=0}^{N_{symb,all}^{PUSCH}-1} M_{sc}^{UCI}(l)$$

in equation 1 may correspond to a number of REs potentially available for UCI across all of the PUSCH symbols.

In contrast, for the multiple slot PUSCH transmission occasion of FIG. 10, $$\sum_{l=0}^{N_{symb,all}^{PUSCH}-1} M_{sc}^{UCI}(l)$$

in equation 1 may correspond to a number of REs potentially available for the UCI 1008 across the PUSCH symbols in slot 0 1004, and $$\sum_{r=0}^{C_{UL-SCH}-1} K_r$$

in equation 1 may correspond to a total number of PUSCH bits scaled by a number of symbols in slot 0 divided by the total number of PUSCH symbols in the transmission occasion 1002, e.g., including both slot 0 1004 and slot 1 1006. Such a determination better takes into account the overall burden placed on the PUSCH transmission when multiplexing the UCI 1008 into slot 0.

After determining the number of resources to use for the UCI 1008 in slot 0 in FIG. 10, the UE may identify a location of the resources within slot 0 1004. The UE may then fill the identified resources in slot 0 1004 with the UCI symbols. The UE may fill the frequency resources of a particular symbol first, and then in additional symbols, e.g., if all of the frequency resources of a symbol are filled with the UCI. Such a filling of resources may be referred to a frequency first, time second manner. The UE may determine PUSCH rate matching bits using the remaining resources in slot 0 1004 and slot 1 1006, e.g., based on the remaining resources of the transmission occasion. The UE may interleave the rate matched bits of the PUSCH 1110. As shown in table 1, the interleaving for example 1 may be either per slot (e.g., as described in connection with FIG. 7) or per transmission occasion (e.g., as described in connection with FIG. 6). After interleaving, the UE may fill the resources of the transmission occasion 1002 identified for the PUSCH 1010 with the interleaved bits mapped to modulation symbols.

Figure 11:
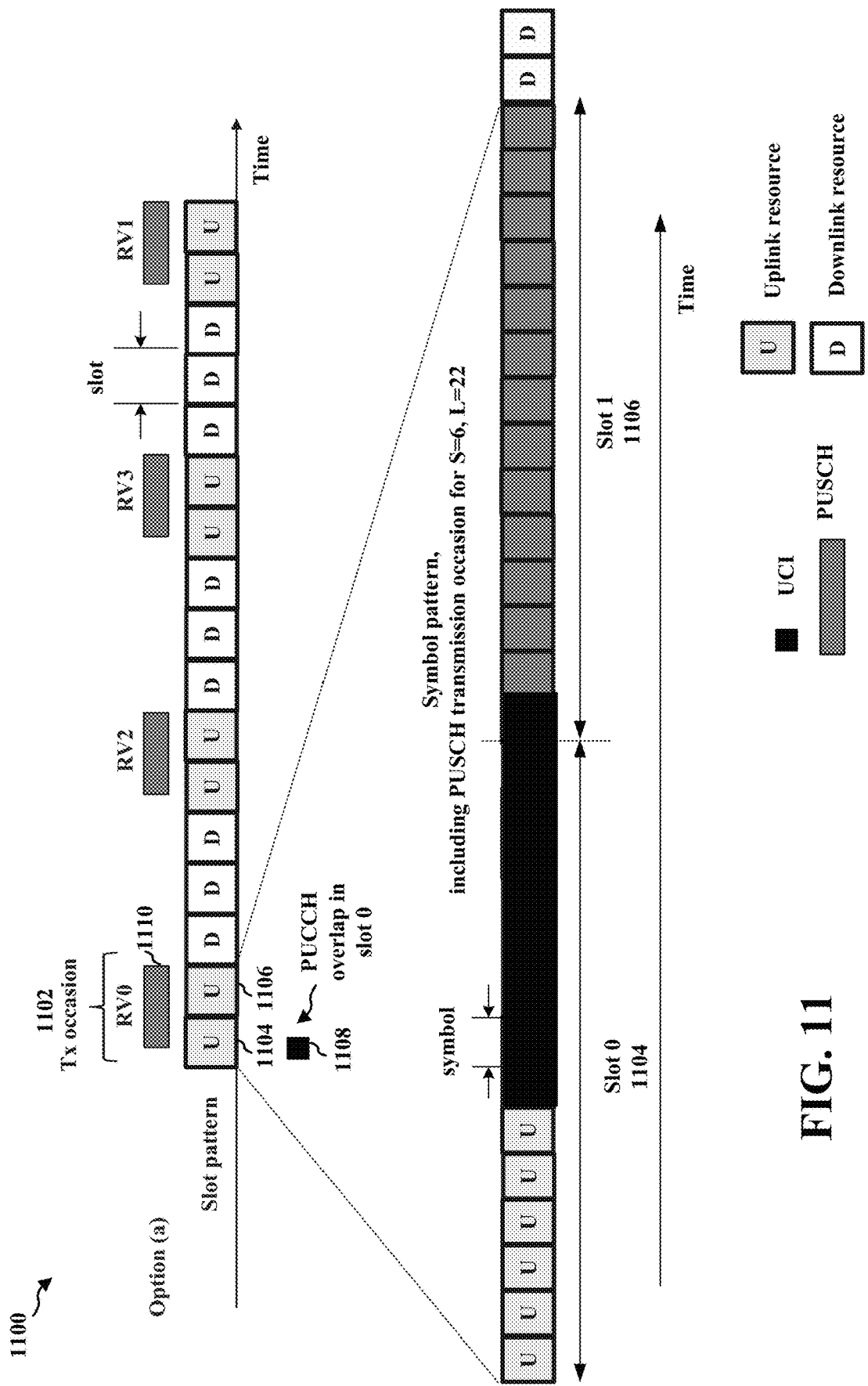
FIG. 11 illustrates an example of multiplexing UCI across a transmission occasion for a multiple slot PUSCH transmission, the transmission occasion having contiguous resources.

FIG. 11 is a diagram 1100 showing PUCCH (e.g., UCI 1108) that overlaps with PUSCH 1110 in slot 0 1104 of a transmission occasion 1102, and is multiplexed based on the transmission occasion 1102 rather than just the slot of overlap. FIG. 11 corresponds to example 2 in Table 1 in which the overlapping slot is slot 0 and the multiplexing is based on the transmission occasion. As illustrated in FIG. 11, the resources for multiplexing the UCI 1108 may span multiple slots.

In the example in FIG. 11, the UE may determine the resources for the UCI based on resources available in the transmission occasion 1102. For example, in the multiple slot PUSCH transmission occasion 1102 of FIG. 11, $$\sum_{l=0}^{N_{symb,all}^{PUSCH}-1} M_{sc}^{UCI}(l)$$

in equation 1 may correspond to a number of REs potentially available for the UCI 1108 across the PUSCH symbols of the transmission occasion 1102 (including slot 0 1104 and slot 1 1106), and $$\sum_{r=0}^{C_{UL-SCH}-1} K_r$$

in equation 1 may correspond to a total number of PUSCH bits of the multiple slots of the transmission occasion 1102.

After determining the number of resources to use for the UCI 1108 in the transmission occasion 1102, the UE may identify a location of the resources within the transmission occasion 1102. The UE may then fill the identified resources in the transmission occasion 1102 with the UCI symbols. The UE may fill the resources in a frequency first, time manner. The UE may determine PUSCH rate matching bits using the remaining resources in the transmission occasion 1102 (e.g., in slot 0 1104 and slot 1 1106). The UE may interleave the rate matched bits of the PUSCH. As illustrated in Table 1, at example 2, the rate matching and interleaving or the RV cycling may be per slot (e.g., as described in connection with FIG. 7) or per transmission occasion (e.g., as described in connection with FIG. 6). After interleaving, the UE may fill the resources of the transmission occasion 1102 identified for the PUSCH 1110 with the interleaved bits mapped to modulation symbols.

Figure 12:
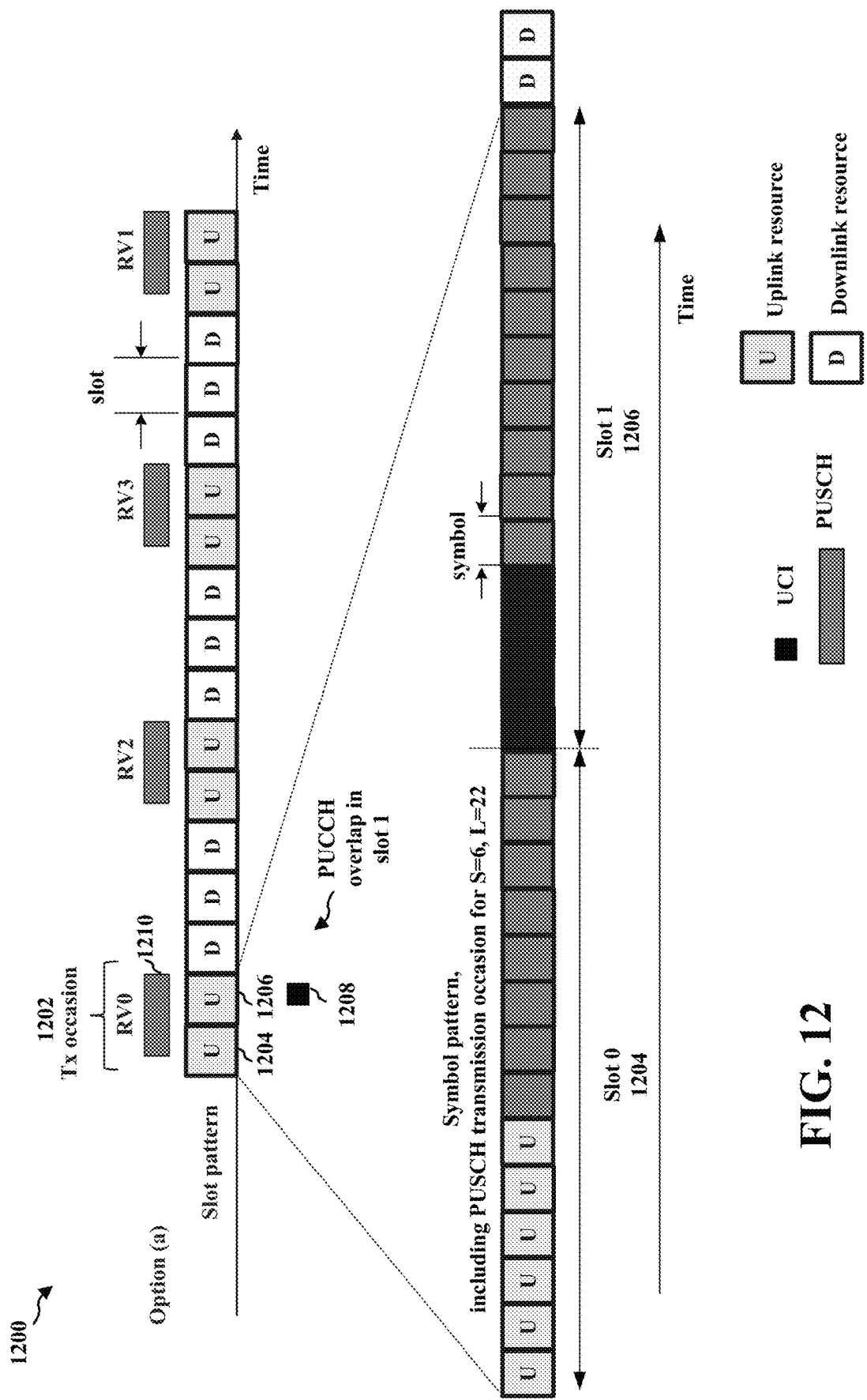
FIG. 12 illustrates an example of multiplexing UCI in an overlapped slot of a transmission occasion for a multiple slot PUSCH transmission, the transmission occasion having contiguous resources.

FIG. 12 illustrates a diagram 1200 showing PUCCH (e.g., UCI 1208) that overlaps with slot 1 1206 of a transmission occasion 1202 for PUSCH 1210 rather than a first slot 1204 of the transmission occasion 1202, as in FIGS. 10 and 11. FIG. 12 corresponds to example 3 in Table 1, in which the overlapping slot is slot 1 and is multiplexed in slot 1. FIG. 12 illustrates an example in which the UCI 1208 is multiplexed within a single slot (e.g., slot 1 1206).

The UE may determine the number of resources to use for the UCI 1208 in slot 1 1206. Similar to the explanation in connection with FIG. 10, the UE may determine the number of resources based on the number of REs potentially available for the UCI in the PUSCH symbols of slot 1 1206 and based on the total number of PUSCH bits scaled by the number of symbols in slot 1 and the total number of PUSCH symbols in the transmission occasion.

For example, $$\sum_{l=0}^{N_{symb,all}^{PUSCH}-1} M_{sc}^{UCI}(l)$$

in equation 1 may correspond to a number of REs potentially available for the UCI 1208 across the PUSCH symbols in slot 1 1206, and $$\sum_{r=0}^{C_{UL-SCH}-1} K_r$$

in equation 1 may correspond to a total number of PUSCH bits scaled by a number of symbols in slot 1 1206 divided by the total number of PUSCH symbols in the transmission occasion 1202, e.g., including both slot 0 1204 and slot 1 1206.

After determining the number of resources to use for the UCI 1208 in slot 1 in FIG. 12, the UE may identify a location of the UCI resources within slot 1 1204. The UE may then fill the identified resources in slot 1 1204 with the UCI symbols. The UE may fill the resources in a frequency first, time manner. The UE may determine PUSCH rate matching bits using the remaining resources in slot 1 1206. The UE may determine the rate matched bits of for slot 1 based on where the slot 0 transmission ended. The UE may then interleave the rate matched bits. As shown in table 1, the interleaving for example 3 may be either per slot (e.g., as described in connection with FIG. 7) or per transmission occasion (e.g., as described in connection with FIG. 6). After interleaving, the UE may fill the resources identified for the PUSCH 1210 with the interleaved bits mapped to modulation symbols.

Figure 13:
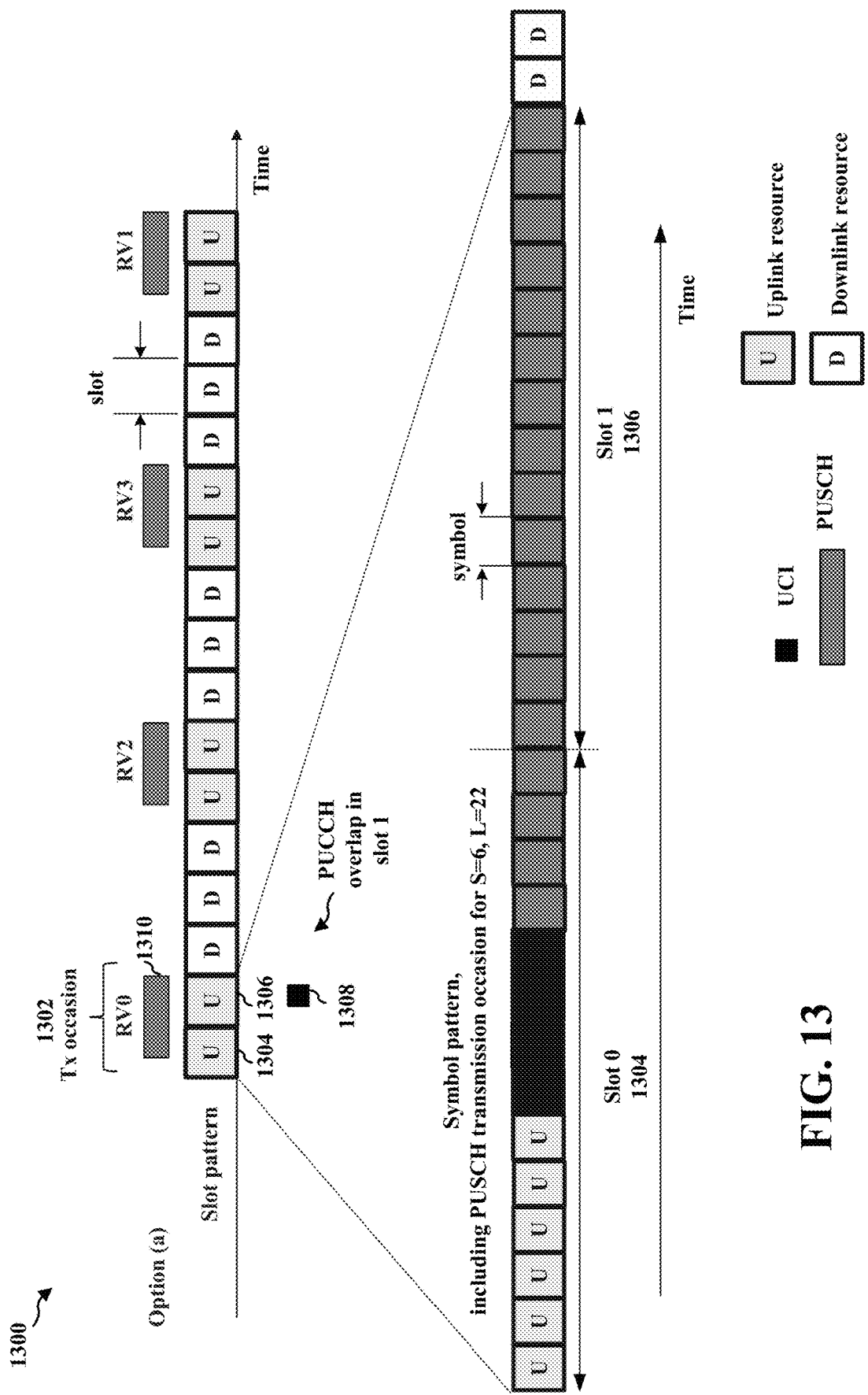
FIG. 13 illustrates an example of multiplexing UCI over a transmission occasion for a multiple slot PUSCH transmission, the transmission occasion having contiguous resources.

FIG. 13 illustrates a diagram 1300 showing PUCCH (e.g., UCI 1308) that overlaps with slot 1 1306 of a transmission occasion 1302 for PUSCH 1310 rather than a first slot 1304 of the transmission occasion 1302, as in FIGS. 10 and 11. In contrast to FIG. 12, in FIG. 13, the UCI is multiplexed based on the transmission occasion rather than the slot of overlap. Thus, in FIG. 12, the UCI is multiplexed in slot 0 1304, and not necessarily in the slot with which the UCI overlaps. In some aspects, the multiplexed UCI may span multiple slots. FIG. 13 may correspond to the example 4 in Table 1.

In the example in FIG. 13, the UE may determine the resources for the UCI 1308 based on resources available in the transmission occasion 1302. For example, in the multiple slot PUSCH transmission occasion 1302 of FIG. 13, $$\sum_{l=0}^{N_{symb,all}^{PUSCH}-1} M_{sc}^{UCI}(l)$$

in equation 1 may correspond to a number of REs potentially available for the UCI 1308 across the PUSCH symbols of the transmission occasion 1302 (including slot 0 1304 and slot 1 1306), and $$\sum_{r=0}^{C_{UL-SCH}-1} K_r$$

in equation 1 may correspond to a total number of PUSCH bits of the multiple slots of the transmission occasion 1302.

After determining the number of resources to use for the UCI 1308 in the transmission occasion 1302, the UE may identify a location of the resources within the transmission occasion 1302. The UE may then fill the identified resources in the transmission occasion 1302 with the UCI symbols. The UE may fill the resources in a frequency first, time manner. The UE may determine PUSCH rate matching bits using the remaining resources in the transmission occasion 1302 (e.g., in slot 0 1304 and slot 1 1306). The UE may interleave the rate matched bits of the PUSCH. As illustrated in Table 1, at example 4, the rate matching and interleaving, and/or the RV cycling may be per slot (e.g., as described in connection with FIG. 7) or per transmission occasion (e.g., as described in connection with FIG. 6). After interleaving, the UE may fill the resources of the transmission occasion 1302 identified for the PUSCH 1310 with the interleaved bits mapped to modulation symbols.

Figure 14:
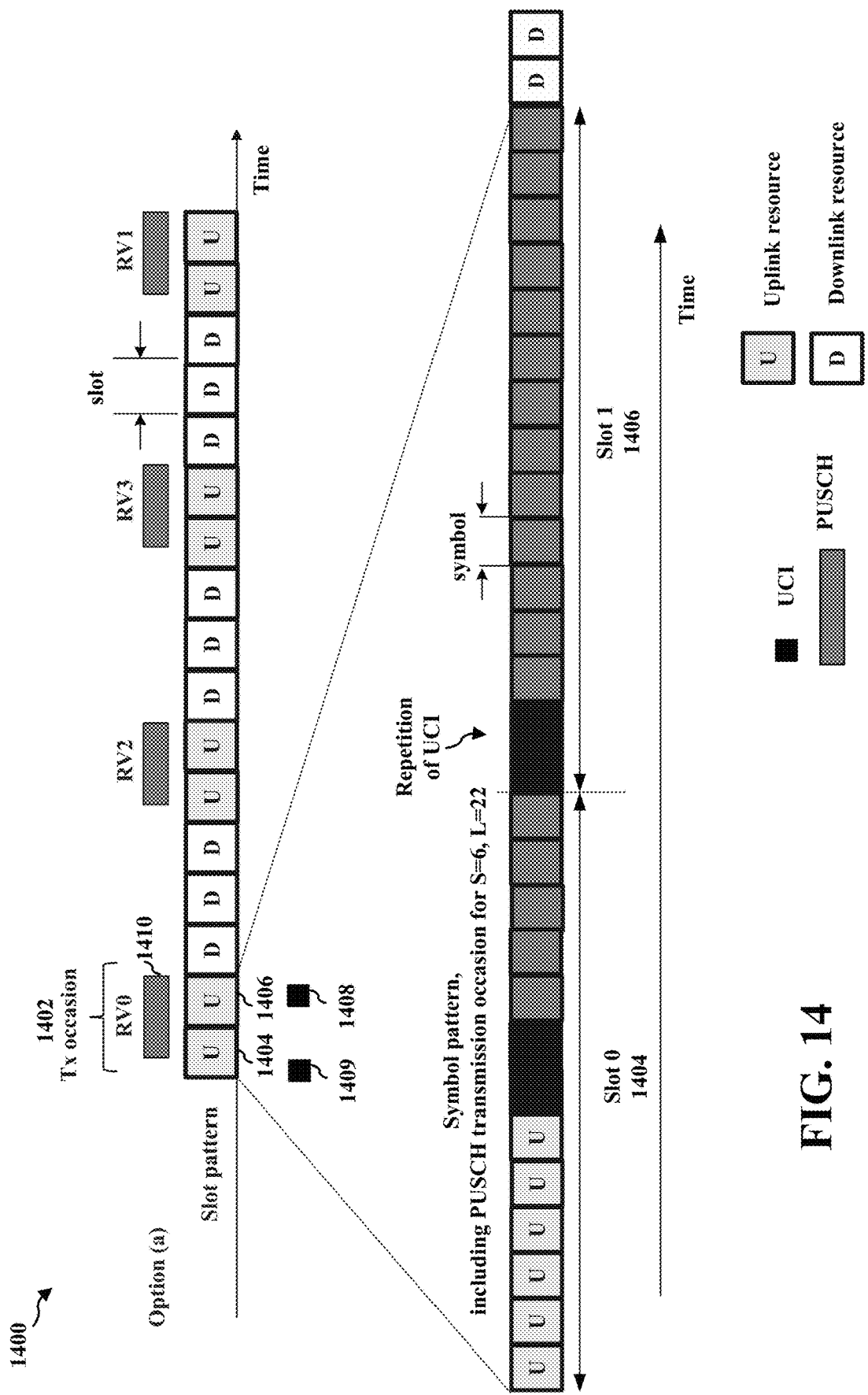
FIG. 14 illustrates an example of multiplexing repetitions of UCI in a transmission occasion for a multiple slot PUSCH transmission, the transmission occasion having contiguous resources.

FIG. 14 illustrates a diagram 1400 showing PUCCH (e.g., UCI 1408 and/or 1409) that is multiplexed with multiple slots of the transmission occasion 1402 (e.g., slot 0 1404 and slot 1 1406) for PUSCH 1410. The resources to use for multiplexing the UCI may be comprised in a single slot, and may be repeated in each slot. The UCI may be repeated in each slot of the transmission occasion 1402. The timeline may be based on slot 0 1404 of the transmission occasion 1402. FIG. 14 may correspond to example 5 in Table 1.

Figure 15:
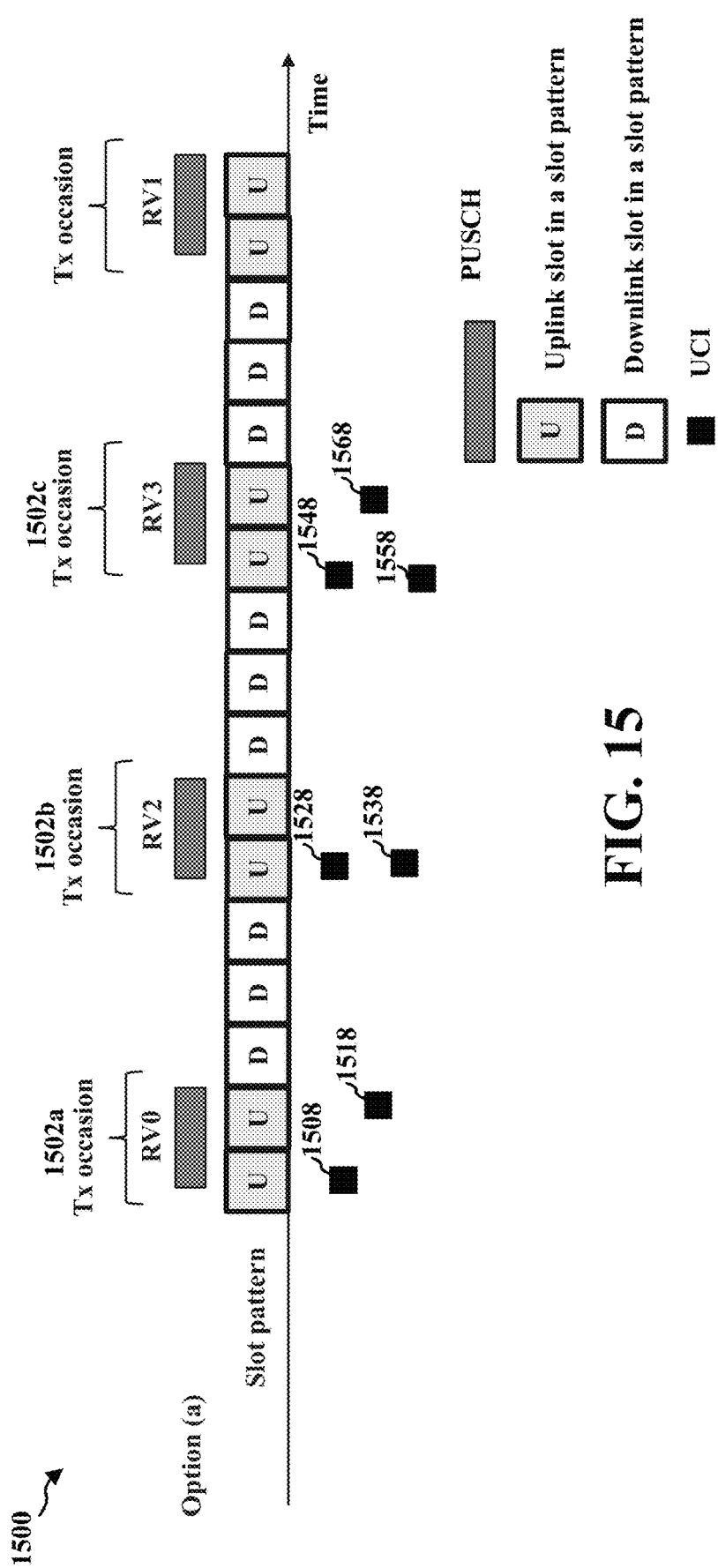
FIG. 15 illustrates an example of multiple UCI overlapping a transmission occasion for a multiple slot PUSCH transmission, the transmission occasion having contiguous resources.

FIG. 15 illustrates a diagram 1500 showing multiple PUCCHs (e.g., UCI 1508, 1518, 1528, 1538, 1548, 1558, 1568) that overlap in various combinations with transmission occasions for multiple slot PUSCH transmissions. For example, transmission occasion 1502a overlaps with PUCCH for UCI 1508 in slot 0 of the transmission occasion and with PUCCH for UCI 1518 in slot 1 of the transmission occasion, e.g., an overlap of single UCI with different slots of the transmission occasion 1502a. The transmission occasion 1502b has a single slot that is overlapped with multiple PUCCHs, e.g., for UCI 1528 and 1538. The transmission occasion 1502c has an overlap of UCI 1548 and 1558 in one slot and UCI 1568 in another slot of the transmission occasion 1502c.

When multiplexing multiple UCI for multiple PUCCHs in a single transmission occasion comprising multiple slots for PUSCH transmission, the UE may handle the overlap on a per slot basis, and may multiplex the UCI with the PUSCH on a per slot basis.

In other aspects, when multiplexing multiple UCI for multiple PUCCHs in a single transmission occasion comprising multiple slots for PUSCH transmission, the UE may handle the overlap across the transmission occasion. The UE may multiplex the UCI across the transmission occasion, e.g. even if the PUCCHs do not occur in the same slot of the transmission occasion, such as with UCI 1508 and 1518, or with UCI 1548 and UCI 1568. In some aspects, the UE may jointly multiplex the UCI.

Figure 16:
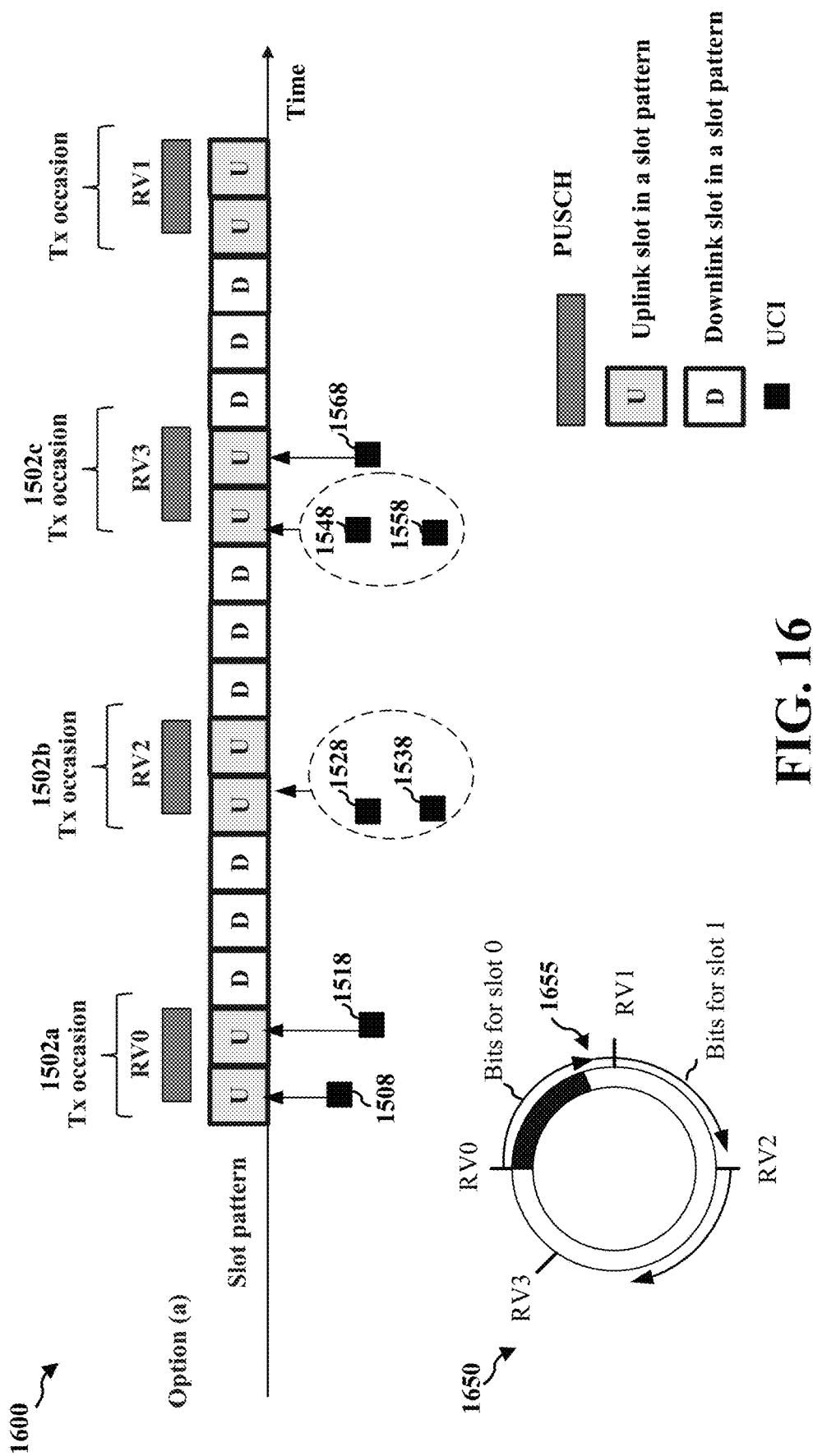
FIG. 16 illustrates an example of multiplexing multiple UCI overlapping a transmission occasion for a multiple slot PUSCH transmission on an overlapped slot basis.

If the overlapping UCI is handled on a per slot basis, the UE may multiplex the UCI, whether a single UCI or multiple overlapping UCI within the corresponding slot of the transmission occasion that is overlapped. FIG. 16 illustrates a diagram 1600 showing with arrows the slot in which the UCI in FIG. 15 is handled/multiplexed in the per slot example. The PUSCH may be rate matched on a per slot basis. Between slots, the UE may remember, or store, the starting position in the circular buffer. For example, the circular buffer 1650 in FIG. 16 illustrates a point 1655 for the bits between slot 0 and slot 1. The PUSCH may be interleaved on a per slot basis, e.g., as described in connection with FIG. 7.

Figure 17:
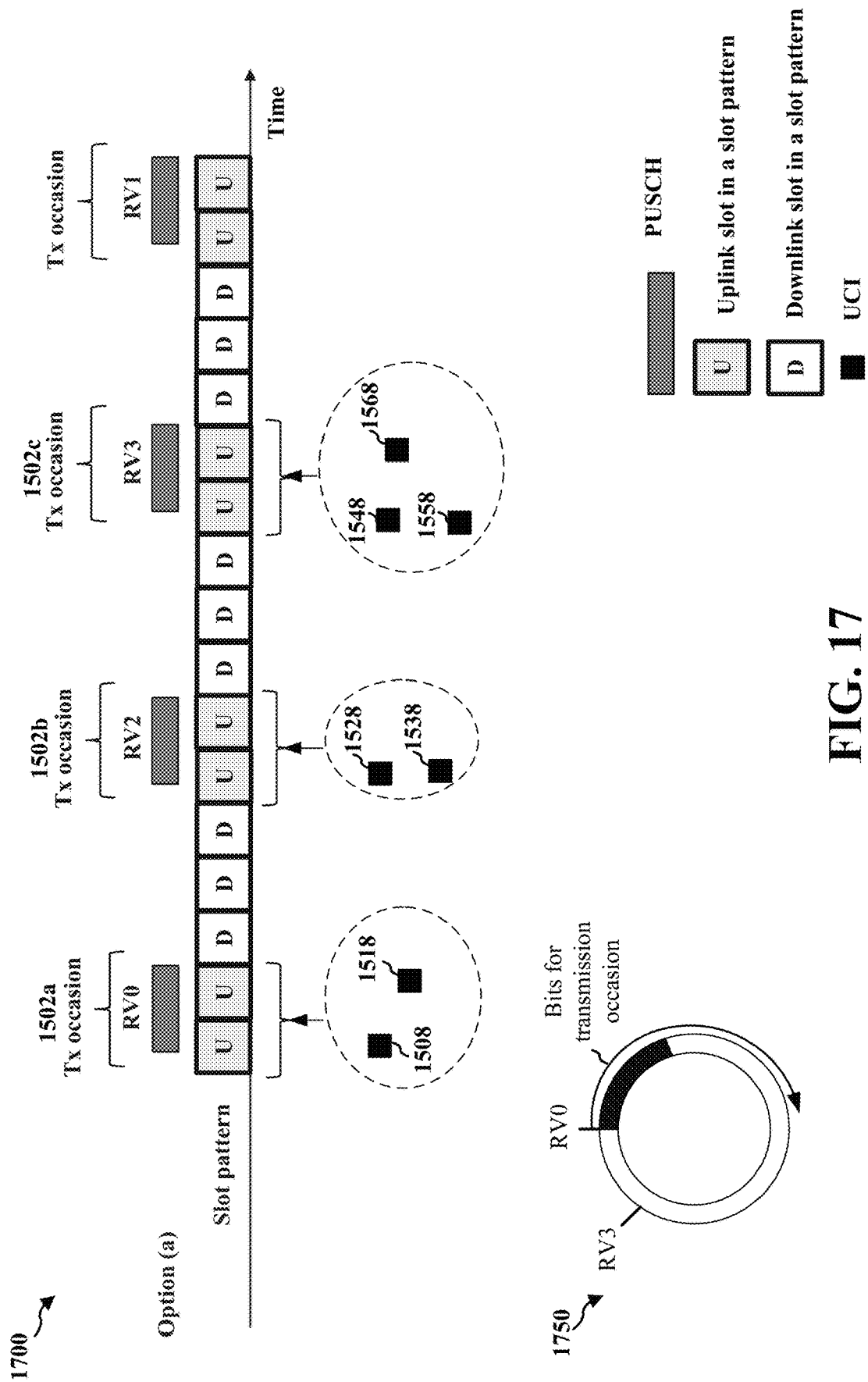
FIG. 17 illustrates an example of multiplexing multiple UCI overlapping a transmission occasion for a multiple slot PUSCH transmission on transmission occasion basis.

If the overlapping UCI is handled across the transmission occasion, even if the PUCCHs do not occur within the same slot, they may influence each other's multiplexing. The UE may determine the UCI resources for multiplexing purposes at the beginning of the transmission occasion. For timeline purposes, the UE may look at an overlap in slot 1 prior to the beginning of the transmission occasion. For PUSCH handling, the UE may rate match the PUSCH across the entire transmission occasion. The UE may interleave the PUSCH across the transmission occasion, such as described in connection with FIG. 6. FIG. 17 illustrates a diagram 1700 showing, with arrows, the UCI in FIG. 15 being handled per transmission occasion. The PUSCH may be rate matched on a per slot basis. For example, the circular buffer 1750 in FIG. 17 illustrates application of the circular buffer for the combined bits of the transmission occasion.

Figure 18:
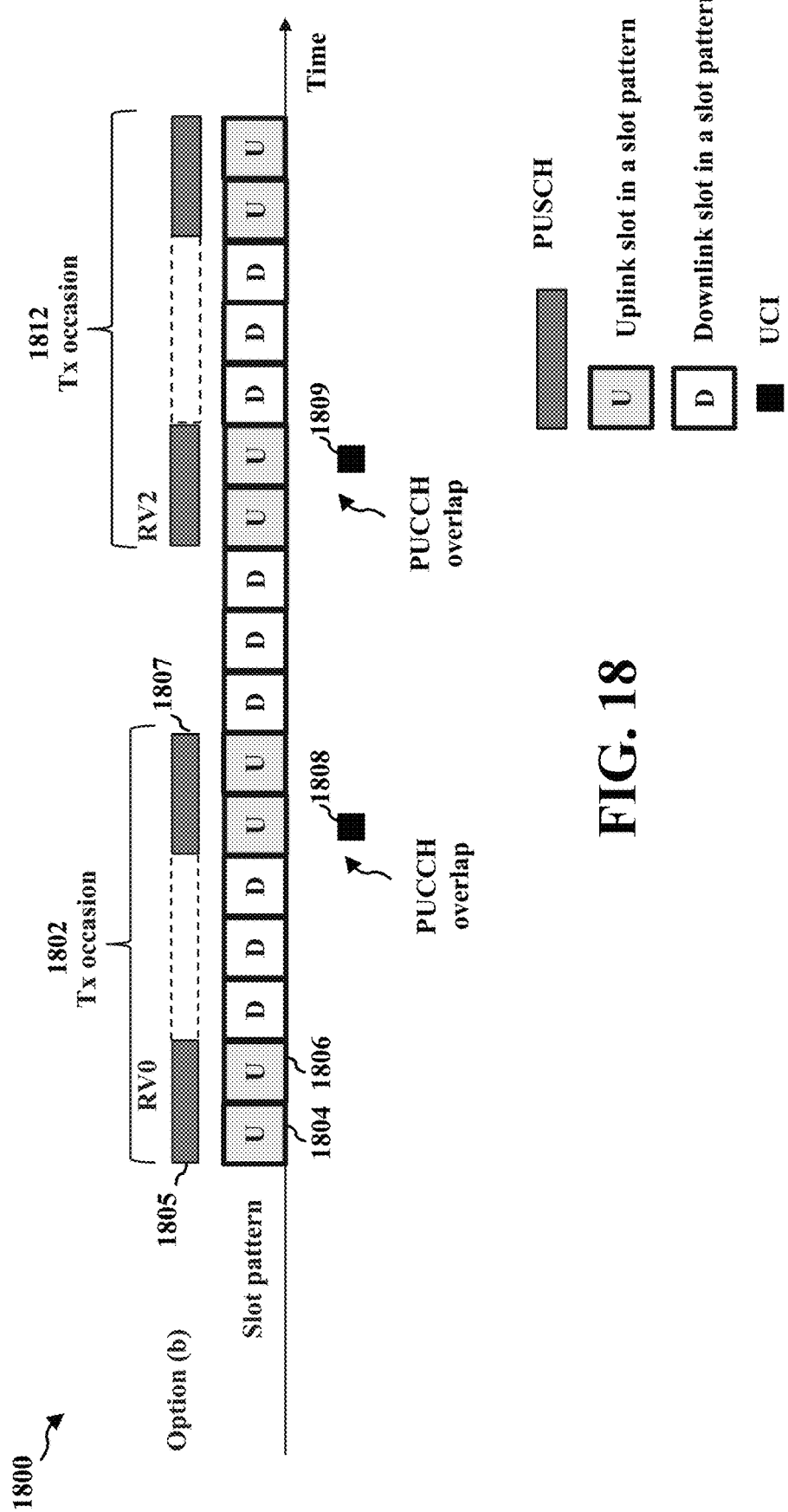
FIG. 18 illustrates an example of UCI overlapping in time with a transmission occasion for a multiple slot PUSCH transmission, the transmission occasion having non-contiguous segments of resources.

FIG. 18 illustrates a diagram 1800 showing PUCCH resources for UCI 1808 and 1809 that overlap with transmission occasions 1802 and 1812 that include non-contiguous segments of resources, e.g., option (b) described in connection with FIG. 4. For example, the transmission occasion 1802 includes segment 1805 and segment 1807 that are separated in time by resources that are not included in the transmission occasion 1802. The segments 1805 and 1807 each include a contiguous set of resources. For example, the segment 1805 is illustrated as having resources in a first slot 1804 and a second slot 1806. Each transmission occasion, e.g., 1802 and 1812, may be handled independently for the purpose of multiplexing UCI with the PUSCH that is transmitted over the multiple slots of one transmission occasion. The per transmission occasion may have aspects that correspond to the per slot handling of PUSCH and PUCCH. In some aspects, each contiguous segment within a transmission occasion may be handled independent of the other segment(s).

In some aspects, the UE may consider, e.g., handle or apply, multiplexing the PUCCH within the slot of overlap, and not within the non-overlapped slot(s). The aspects of the multiplexing in this example may be applied similar to the multiplexing within the overlapped slot for a contiguous transmission occasion, e.g., such as described in connection with example 1 and example 3 in table 1, as well as FIGS. 10 and 12.

In some aspects, the UE may consider, e.g., handle or apply, multiplexing over an entire transmission occasion, e.g., 1802, including non-contiguous segments 1805 and 1807. The aspects of the multiplexing in this example may be applied similar to the multiplexing over the transmission occasion for a contiguous transmission occasion, e.g., such as described in connection with example 2 and example 4 in table 1, as well as FIGS. 11 and 13.

In some aspects, the UE may consider, e.g., handle or apply, multiplexing over a contiguous portion of a transmission occasion, e.g., within overlapped segment, e.g., 1807, of the transmission occasion 1802. Table 2 illustrates example aspects of handling UCI multiplexing with a multiple slot PUSCH per segment of a transmission occasion including non-contiguous segments of resources for UCI 1808.

TABLE 2

|  | Overlapping slot | Multiplexing slot/TO | Multiplexing slot/TO | Timeline |
|---|---|---|---|---|
| Ex. 1 | Slot 5 | TO segment in slot 5 and 6 | Per-slot rate matching and interleaving, Or Per slot RV cycling Or Or Per-TO rate matching and interplexing, Or Per-TO RV cycling | Slot 5 based or beginning of TO |

Figure 19:
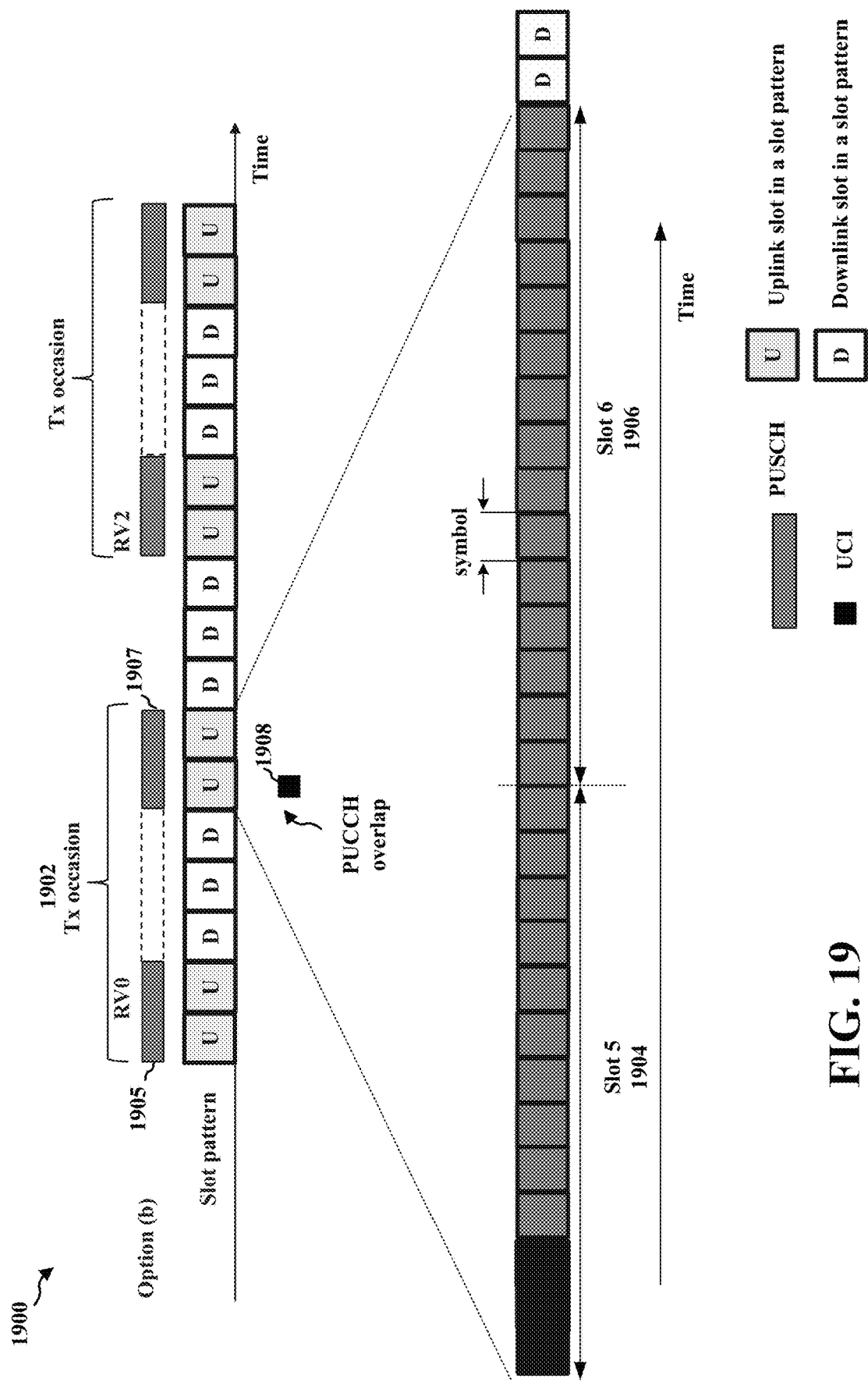
FIG. 19 illustrates an example of multiplexing UCI overlapping a transmission occasion for a multiple slot PUSCH transmission on segment basis, the transmission occasion having non-contiguous segments of resources.

FIG. 19 illustrates a diagram 1900 showing UCI multiplexed based on an overlapped segment of a non-contiguous transmission occasion 1902. The transmission occasion includes non-contiguous segments 1905 and 1907. Segment 1907 is overlaps in time with a PUCCH for the transmission of UCI 1908. Based on the overlap, the UCI 1908 may be multiplexed with a PUSCH TB for transmission in the transmission occasion. The multiplexing may be handled per segment, with the multiplexing in segment 1907 being handled independently of processing for segment 1905. The segment 1907 includes resources spanning two slots, e.g., slot 5 1904 and slot 6 1906. The resources for multiplexing the UCI 1908 may be determined based on the segment within which the PUCCH is multiplexed. The UCI resources may be determined based on the segment's resources.

As an example, the number of resources for multiplexing the UCI may be determined based on a number of REs potentially available for the UCI across the PUSCH symbols in the corresponding segment of the transmission occasion. The determination may also be based on a total number of PUSCH bits scaled by a number of symbols in the corresponding segment and the total number of PUSCH symbols. For example, in equation 1, $$\sum_{l=0}^{N_{symb,all}^{PUSCH}-1} M_{sc}^{UCI}(l)$$

in equation 1 may correspond to a number of REs potentially available for the UCI 1908 across the PUSCH symbols of the corresponding segment of the transmission occasion (e.g., segment 1907 of transmission occasion 1902), and $$\sum_{r=0}^{C_{UL-SCH}-1} K_r$$

in equation 1 may correspond to a total number of PUSCH bits of the transmission occasion 1902 scaled by a number of symbols in the corresponding segment divided by the total number of PUSCH symbols in the transmission occasion.

After determining the number of resources to use for the UCI 1908 in slot 5 in FIG. 19, the UE may identify a location of the UCI resources within slot 5 1904. The UE may then fill the identified resources in slot 5 1904 with the UCI symbols. The UE may fill the resources in a frequency first, time manner. The UE may determine PUSCH rate matching bits using remaining resources and may interleave the rate matched bits. After interleaving, the UE may fill the resources identified for the PUSCH with the interleaved bits mapped to modulation symbols.

Figure 20:
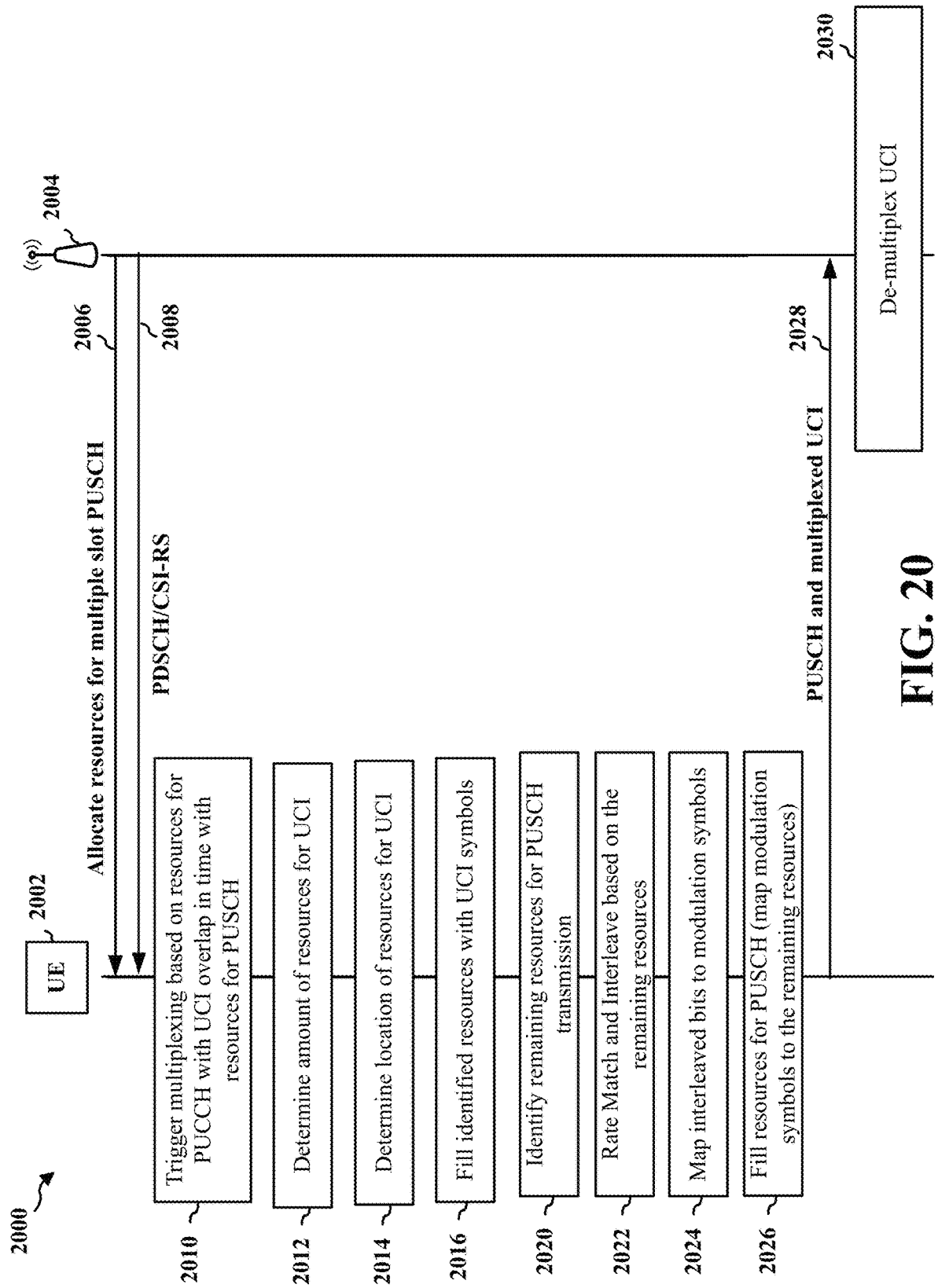
FIG. 20 is an example communication flow between a UE and a base station including the transmission of UCI multiplexed with a multiple slot PUSCH transmission.

FIG. 20 illustrates an example communication flow 2000 between a UE 2002 and a base station 2004 including the transmission of UCI multiplexed with a multiple slot PUSCH transmission 2010. As illustrated at 2006, the base station 2004 may allocate, or grant, resources to the UE 2002 for a PUSCH transmission. The allocated resources may include a transmission occasion spanning multiple slots, such as described in connection with FIG. 4. At 2010, the UE may trigger multiplexing of UCI with the multiple slot PUSCH transmission based on determining an overlap in time between PUCCH resources for the UCI and the transmission occasion for the PUSCH. As a non-limiting example to illustrate the concept, the UE may receive a downlink transmission 2008 for which the UE has UCI to transmit to the base station 2004. The downlink transmission may include PDSCH, which may be transmitted before or after the uplink grant, at 2006. The UE may have ACK/NACK information about the PDSCH to transmit as the UCI that overlaps the resources for the PUSCH. As another example, the downlink transmission 2008 may include CSI-RS, and the UE may have CSI to report to the base station as UCI.

As illustrated at 2012, in order to multiplex the UCI with the PUSCH transmission, the UE determines the amount of resources for the UCI. The UE may determine the resources based on the type of transmission occasion (e.g., contiguous or non-contiguous segments, such as described in connection with FIG. 4). The UE may also determine the resources based on whether multiplexing is handled per slot, per transmission occasion, or per segment of a transmission occasion. The UE may also determine the resources based on whether the overlap occurs in a first slot of a transmission occasion, or segment, or in a subsequent slot. The determination may be based on any of the aspects described in connection with FIGS. 10-19. The determination may be based on the modified aspects of equation 1, as described herein.

At 2014, the UE determines the location of the resources for the UCI within the PUSCH transmission occasion. At 2016, the UE fills the identified resources with the UCI symbols. In some aspects, the UE may fill the resources in a frequency first, time manner. At 2020, the UE identifies the remaining resources of the transmission occasion that are available for the PUSCH transmission, e.g., remaining after filling part of the resources of the transmission occasion with the UCI. At 2022, the UE applies rate matching and interleaving based on the remaining resources. The rate matching and interleaving may be based on any of the aspects described in connection with the examples in FIGS. 4-19. As an example, he interleaving may be per slot, as in FIG. 7, per transmission occasion, as in FIG. 6, or per segment, as in FIG. 8. The type of rate matching and interleaving may be based on the type of transmission occasion and the manner in which the UCI is multiplexed, as described herein. At 2024, the UE maps the interleaved bits to modulation symbols, and at 2026, the UE fills the remaining resources of the transmission occasion with the PUSCH transmission by mapping the modulation symbols, mapped at 2024, to the remaining resources of the transmission occasion. At 2028, the UE 2002 transmits the PUSCH and the multiplexed UCI to the base station 2004. As illustrated at 2030, the base station may de-multiplex the UCI from the PUSCH in order to obtain the information in the UCI.

Figure 21:
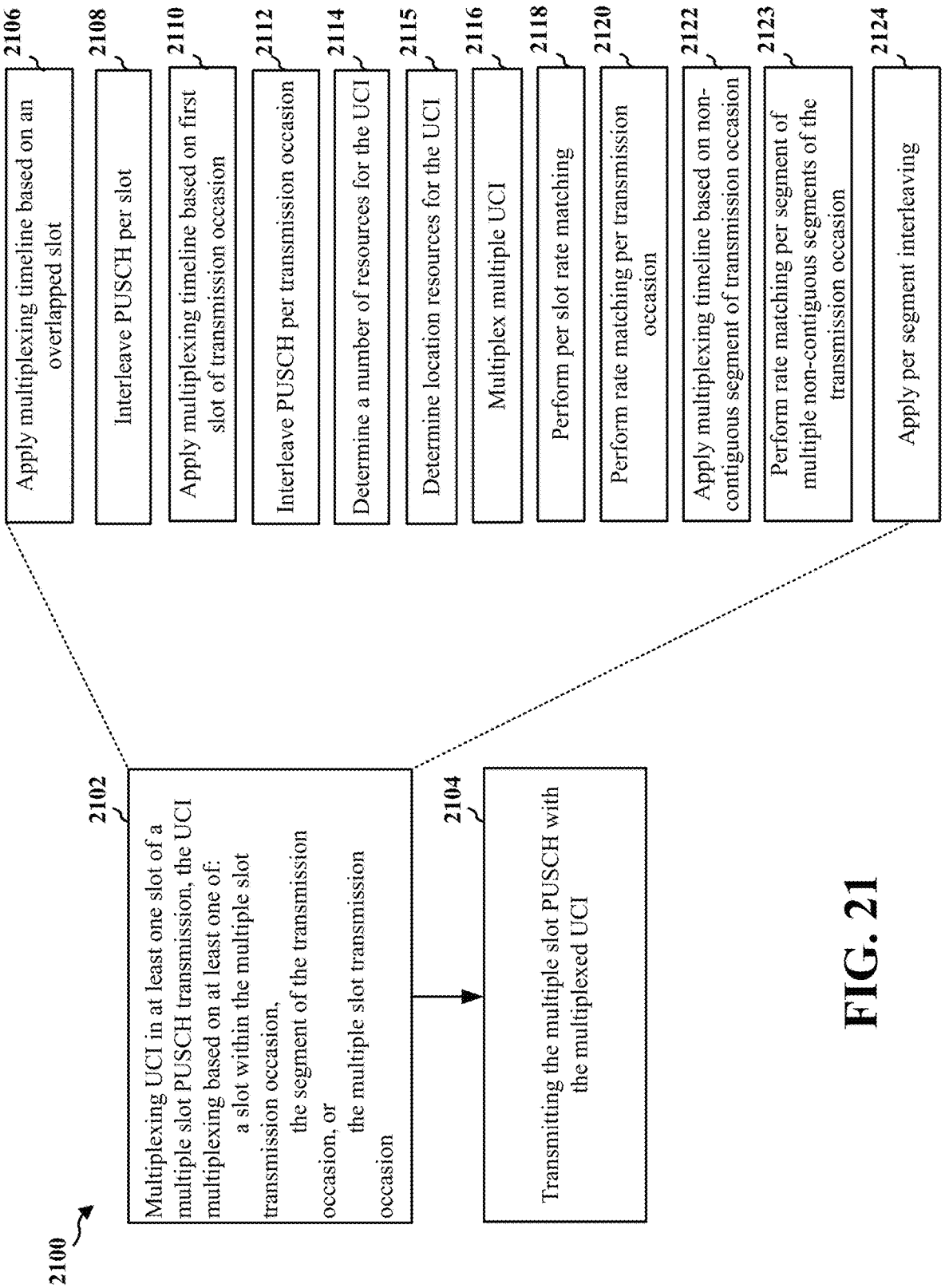
FIG. 21 is a flowchart of a method of wireless communication including the transmission of UCI multiplexed with a multiple slot PUSCH transmission.

FIG. 21 is a flowchart 2100 of a method of wireless communication. The method may be performed by a UE (e.g., the UE 104, 350, 2002; the apparatus 2202). The method may enable the UE to multiplex UCI within a transmission occasion for a multiple slot PUSCH.

At 2102, the UE multiplexes UCI in a segment of a multiple slot PUSCH transmission, the UCI multiplexing being based on at least one of: a slot within the multiple slot transmission occasion, a segment of the transmission occasion, or the multiple slot transmission occasion. A segment may correspond to at least one slot. In some aspects, a segment may correspond to a slot. In some aspects, the segment of the multiple slot transmission occasion may be a non-contiguous segment of the transmission occasion. As described in connection with FIG. 20, the UE may determine to multiplex the UCI based on a resource on which the UCI is to be transmitted overlapping in time with the transmission occasion for the PUSCH transmission. The multiplexing may be performed, e.g., by the UCI multiplexer component 2240 of the apparatus 2202 in FIG. 22.

The multiplexing of the UCI may include any of the aspects described herein. For example, the multiplexing may be based on any of the examples in Table 1 or Table 2. As illustrated at 2114, the UE may determine a number of resources for the UCI, and at 2115 may determine the location of the resources for the UCI.

The multiple slot PUSCH transmission may be transmitted in a transmission occasion comprising a set of contiguous slots, such as described in connection with option (a) in FIG. 4, or as described in connection with FIG. 9. FIGS. 10-17 illustrate various example aspects of multiplexing UCI with a multiple slot PUSCH in a transmission occasion having contiguous resources.

In some aspects the UCI may be multiplexed in a single slot of the multiple slot PUSCH transmission based on the UCI overlapping in time with the single slot, e.g., as described in connection with any of FIG. 10, 12, or 13. In some aspects, multiplexing the UCI may include applying a multiplexing timeline based on a slot of the multiple slot PUSCH transmission that overlaps in time with the UCI, e.g., at 2106. In some aspects, the UE may rate match and interleave the multiple slot PUSCH transmission per slot, as illustrated at 2108. In some aspects, the UE may enable redundancy version cycling per slot for the multiple slot PUSCH transmission. FIG. 7 illustrates an example of rate matching and interleaving per slot.

In some aspects, the multiplexing may include applying a multiplexing timeline based on a first slot of the transmission occasion of the multiple slot PUSCH, e.g., as illustrated at 2110. The UE may rate match and interleave the multiple slot PUSCH transmission per transmission occasion, as illustrated at 2112. In some aspects, the UE may enable redundancy version cycling per transmission occasion. FIG. 6 illustrates an example of rate matching and interleaving per transmission occasion.

In some aspects, the UCI may be multiplexed in a first slot of the multiple slot PUSCH transmission, and multiplexing the UCI, at 2102, may further include multiplexing the UCI in a number of resources in the first slot where the number of resources is determined at least in part on the number of resource elements available for the UCI across a first number of PUSCH symbols in the first slot. In some aspects, the multiplexing may further include multiplexing the UCI in a first slot of the multiple slot PUSCH transmission, and multiplexing the UCI further includes multiplexing the UCI in a number of resources in the first slot where the number of resources is determined at least in part on a scaled number of PUSCH bits where the scaled number of PUSCH bits is obtained by multiplying the total of PUSCH bits by the ratio of number of resource elements available for the UCI across a first number of PUSCH symbols in the first slot to the number of resource elements available for the UCI across a second number of PUSCH symbols in the transmission occasion of the multiple slot PUSCH transmission. The number of resources may be determined at 2114. For example, the number of resources for the UCI may be determined as described in connection with equation 1 and FIG. 10.

The UCI may include a UCI payload comprises hybrid automatic repeat request (HARQ) ACK/NACK bits, and the UCI has a location in a first symbol following a demodulation reference signal in a first slot allocated for the multiple slot PUSCH transmission. The UCI payload may comprise channel state information (CSI), and the UCI has a location based on the first symbol of a first slot allocated for the multiple slot PUSCH transmission.

In some aspects, the UCI may be multiplexed over the transmission occasion. The UE may transmit/multiplex the UCI in resources comprised in a single slot of the multiple slot PUSCH transmission.

In some aspects, the UCI may be transmitted in resources spanning multiple slots of the multiple slot PUSCH transmission. FIG. 11 illustrates an example of the UCI spanning multiple slots of the transmission occasion. The multiplexing, at 2102, may include multiplexing the UCI in a number of resources based on a number of resource elements available for the UCI across a first number of PUSCH symbols in the multiple slot PUSCH transmission divided by a total number of PUSCH bits, which may be determined at 2114. For example, the number of resources for the UCI may be determined as described in connection with equation 1 and FIG. 11.

In some aspects, the UCI may be multiplexed in a single slot of the multiple slot PUSCH transmission and multiplexing the UCI, at 2102, may further includes multiplexing the UCI in a number of resources in the single slot based on a number of resource elements available for the UCI across a first number of PUSCH symbols in the single slot divided by a total number of scaled PUSCH bits, the scaled PUSCH bits being scaled by the first number of PUSCH symbols in the single slot divided by a second number of the PUSCH symbols across the transmission occasion of the multiple slot PUSCH transmission, which may be determined at 2114. For example, the number of resources for the UCI may be determined as described in connection with equation 1 and FIG. 12.

In some aspects, the UCI may overlap in time with a slot after a first slot of the multiple slot PUSCH transmission and may be multiplexed within the first slot of the multiple slot PUSCH transmission, e.g., as described in connection with any of the aspects of FIG. 13.

In some aspects, the UCI may be multiplexed with a repetition in each slot of the transmission occasion. FIG. 14 illustrates an example of the repetition of multiplexed UCI.

In some aspects, multiple PUCCHs may be multiplexed in the PUSCH. For example, the multiplexing at 2101 may include multiplexing a first UCI and a second UCI that overlap with the multiple slot PUSCH transmission, e.g., at 2116. The first UCI and the second UCI may be multiplexed on a per slot basis, e.g., as described in connection with the example in FIG. 16. The first UCI and the second UCI may overlap in different slots of the transmission occasion, and may be multiplexed within the different slots of the multiple slot PUSCH transmission, e.g., as described in connection with FIG. 17. In some aspects, the UE may perform rate matching for the PUSCH transmission per slot of the transmission occasion, at 2118. The UE may carry over a starting position in a circular buffer from a first slot to a second slot. In some aspects, the UE may interleave the PUSCH transmission per slot of the transmission occasion, e.g., as illustrated at 2112 and as illustrated in the example in FIG. 6. The first UCI and the second UCI may be multiplexed across the contiguous slots of the transmission occasion. The first UCI and the second UCI may overlap in different slots of the transmission occasion, and the first UCI and the second UCI may be jointly multiplexed in the multiple slot PUSCH transmission.

In some aspects, the UE may perform rate matching and interleaving for the PUSCH transmission across the multiple slots of the transmission occasion, e.g., as illustrated at 2120.

In some aspects, the multiple slot PUSCH transmission may be transmitted in a transmission occasion comprising a set of non-contiguous slots, e.g., as described in connection with option (b) in FIG. 4 and/or as described in connection with FIGS. 18 and/or 19. The UCI may be multiplexed in a single slot of the multiple slot PUSCH transmission based on the UCI overlapping in time with the single slot. The UCI may be multiplexed over the set of non-contiguous slots of the transmission occasion. The set of non-contiguous slots may comprise multiple contiguous portions, and the UCI may be multiplexed over a contiguous portion of the transmission occasion. The UCI may be multiplexed within the contiguous portion with which the UCI overlaps in time. As illustrated at 2122, the UE may apply a multiplexing timeline based on a slot of the contiguous portion that overlaps in time with the UCI. For example, the UE may apply a multiplexing timeline based on a first slot of the contiguous portion, e.g., a contiguous segment of the transmission occasion. The resources for transmission of the UCI may be based on the contiguous portion. The UCI may be multiplexed in at least one slot of the contiguous portion of the transmission occasion, and multiplexing the UCI, at 2102, may further include multiplexing the UCI in a number of resources in the contiguous portion where a number of resources is determined based at least in part on a number of resource elements available for the UCI across a first number of PUSCH symbols in the contiguous portion. The UCI may be multiplexed in at least one slot of the contiguous portion, and the multiplexing may include multiplexing the UCI in a number of resources in the contiguous portion where the number of resources is determined based at least in part on a scaled number of PUSCH bits, where the scaled PUSCH bits are obtained by multiplying a total of PUSCH bits by the ratio of the first number of PUSCH symbols in the contiguous portion divided by a second number of the PUSCH symbols across the transmission occasion of the multiple slot PUSCH transmission, which may be determined at 2114. At 2123, the UE may perform rate matching for the PUSCH per segment of multiple non-contiguous segments of a transmission occasion. At 2124, the UE may perform per segment interleaving of the PUSCH for each of the non-contiguous segments of a transmission occasion, e.g., as described in connection with FIG. 8.

At 2104, the UE transmits the multiple slot PUSCH transmission with multiplexed UCI. The PUSCH may be transmitted based on any of the aspects described in connection with FIGS. 4-20, for example. FIG. 20 illustrates an example of the UE 2002 transmitting PUSCH with multiplexed UCI to a base station 2004, at 2028. The transmission may be performed, e.g., by the PUSCH component 2242 of the apparatus 2202, e.g., via the transmission component and/or the RF transceiver 2222.

Figure 22:
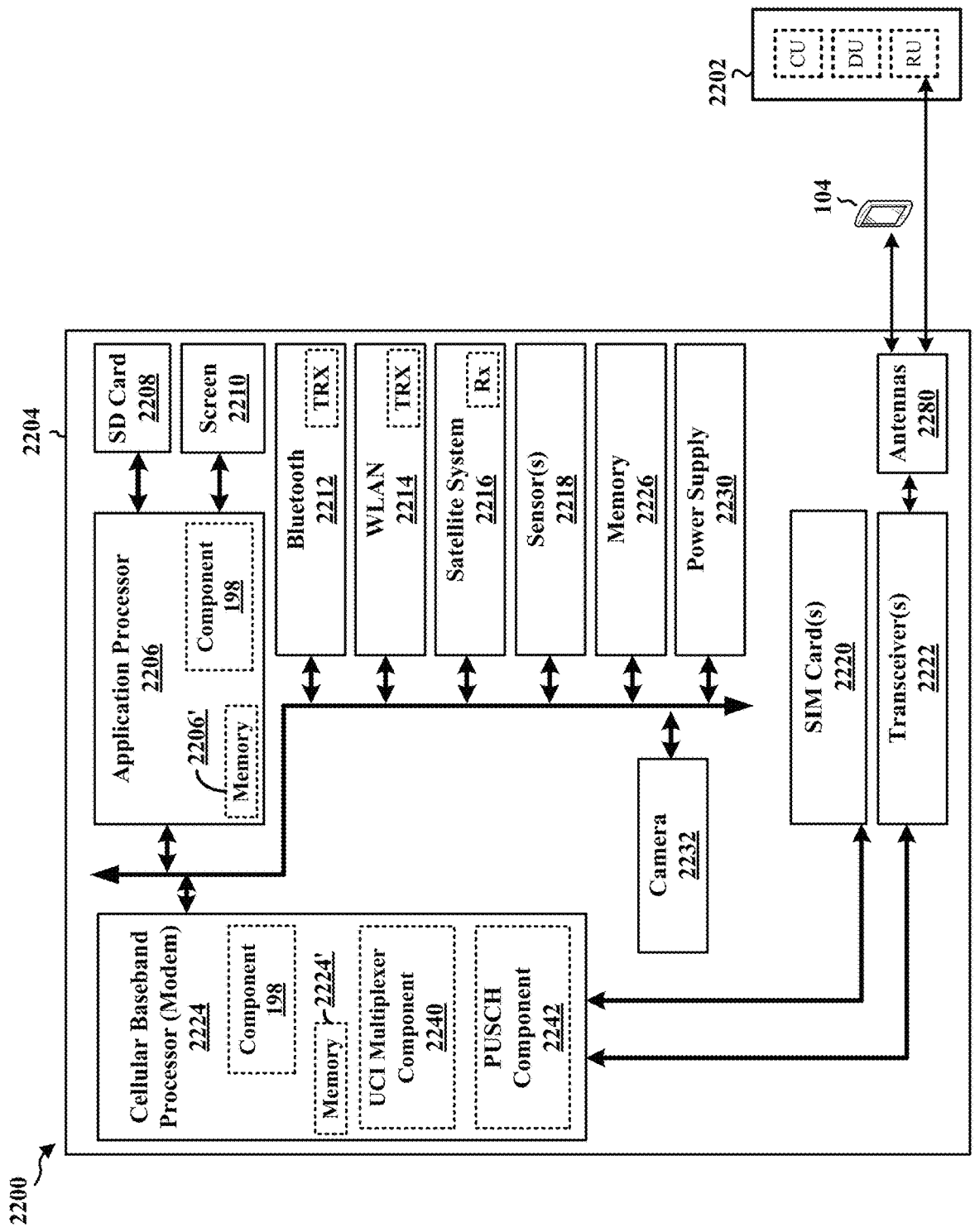
FIG. 22 is a diagram illustrating an example of a hardware implementation for an example apparatus.

FIG. 22 is a diagram 2200 illustrating an example of a hardware implementation for an apparatus 2204. The apparatus 2204 may be a UE, a component of a UE, or may implement UE functionality. In some aspects, the apparatus 2204 may include a cellular baseband processor 2224 (also referred to as a modem) coupled to one or more transceivers 2222 (e.g., cellular RF transceiver). The cellular baseband processor 2224 may include on-chip memory 2224'. In some aspects, the apparatus 2204 may further include one or more subscriber identity modules (SIM) cards 2220 and an application processor 2206 coupled to a secure digital (SD) card 2208 and a screen 2210. The application processor 2206 may include on-chip memory 2206'. In some aspects, the apparatus 2204 may further include a Bluetooth module 2212, a WLAN module 2214, a satellite system module 2216 (e.g., GNSS module), one or more sensor modules 2218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2226, a power supply 2230, and/or a camera 2232. The Bluetooth module 2212, the WLAN module 2214, and the satellite system module 2216 may include an on-chip transceiver (TRX)/receiver (RX). The cellular baseband processor 2224 communicates through the transceiver(s) 2222 via one or more antennas 2280 with the UE 104 and/or with an RU associated with a network entity, e.g., 2202. The cellular baseband processor 2224 and the application processor 2206 may each include a computer-readable medium/memory 2224', 2206', respectively. The additional memory modules 2226 may also be considered a computer-readable medium/memory. Each computer-readable medium/memory 2224', 2206', 2226 may be non-transitory. The cellular baseband processor 2224 and the application processor 2206 are each responsible for general processing, including the execution of software stored on the computer-readable medium/memory. The software, when executed by the cellular baseband processor 2224/application processor 2206, causes the cellular baseband processor 2224/application processor 2206 to perform the various functions described supra. The computer-readable medium/memory may also be used for storing data that is manipulated by the cellular baseband processor 2224/application processor 2206 when executing software. The cellular baseband processor 2224/application processor 2206 may be a component of the UE 350 and may include the memory 360 and/or at least one of the TX processor 368, the RX processor 356, and the controller/processor 359. In one configuration, the apparatus 2204 may be a processor chip (modem and/or application) and include just the cellular baseband processor 2224 and/or the application processor 2206, and in another configuration, the apparatus 2204 may be the entire UE (e.g., see 350 of FIG. 3) and include the additional modules of the apparatus 2204.

The apparatus 2202 includes a UCI multiplexer component 2240 that is configured to multiplex UCI in at least one slot of a multiple slot PUSCH transmission, e.g., as described in connection with 2102 in FIG. 21. The apparatus 2202 further includes a PUSCH component 2242 that is configured to transmit the multiple slot PDSCH with the multiplexed UCI, e.g., as described in connection with 2104 in FIG. 21.

The apparatus may include additional components that perform each of the blocks of the algorithm in the flowchart of FIG. 21 and/or the aspects performed by the UE in FIG. 20. As such, each block in the flowchart of FIG. 21 and/or the aspects performed by the UE in FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As discussed supra, the component 198 may be configured to multiplex UCI in at least one slot of a multiple slot PUSCH transmission and to transmit the multiple slot PDSCH with the multiplexed UCI. The component 198 may be within the cellular baseband processor 2224, the application processor 2206, or both the cellular baseband processor 2224 and the application processor 2206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2204 may include a variety of components configured for various functions. In one configuration, the apparatus 2204, and in particular the cellular baseband processor 2224 and/or the application processor 2206, includes means for multiplexing UCI in at least one slot of a multiple slot PUSCH transmission and means for transmitting the multiple slot PDSCH with the multiplexed UCI. The means may be the component 198 of the apparatus 2204 configured to perform the functions recited by the means. As described supra, the apparatus 2204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 23:
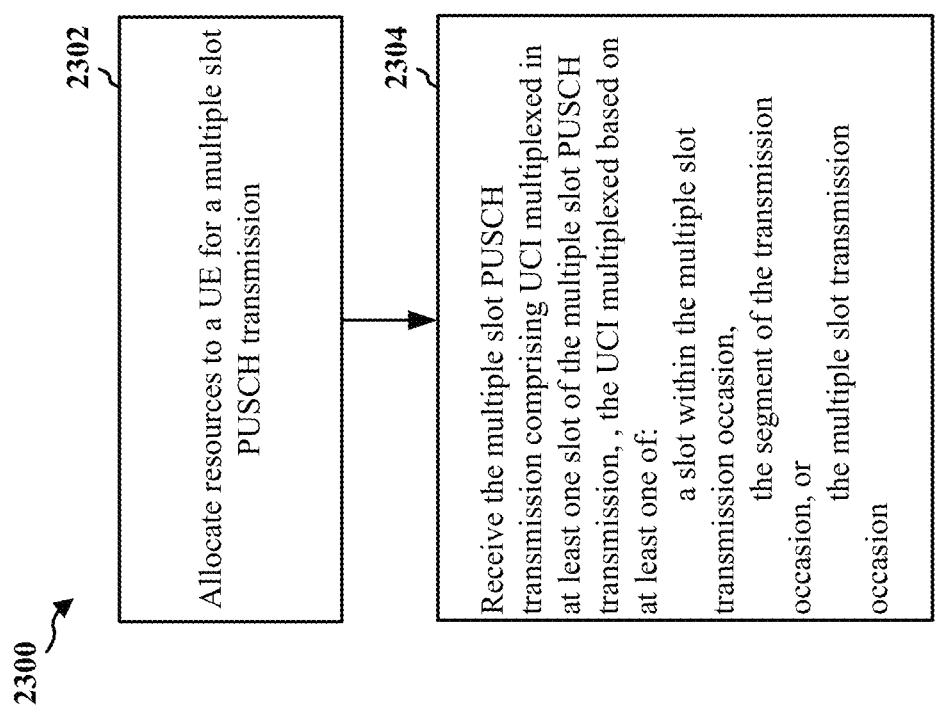
FIG. 23 is a flowchart of a method of wireless communication including the reception of UCI multiplexed with a multiple slot PUSCH transmission

FIG. 23 is a flowchart 2300 of a method of wireless communication. The method may be performed by a base station, a component of base station, or a network entity (e.g., the base station 102/180, 310, 2004; the network entity 2402). The method may enable the base station to receive multiplexed UCI within a transmission occasion for a multiple slot PUSCH.

At 2302, the network entity allocates resources to a UE for a multiple slot PUSCH transmission. The allocation may be performed, e.g., by the PUSCH component 2452 of the network entity 2402 in FIG. 24. FIG. 20 illustrates an example of a base station 2004 allocating resources for PUSCH to the UE 2002.

At 2304, the network entity receives the multiple slot PUSCH transmission comprising UCI multiplexed in a segment of the multiple slot PUSCH transmission, the UCI multiplex based on at least one of: a slot within the multiple slot transmission occasion, a segment of the transmission occasion, or the multiple slot transmission occasion. A segment may correspond to at least one slot. In some aspects, a segment may correspond to a slot. In some aspects, the segment of the transmission occasion may be a non-contiguous segment of the transmission occasion. The reception may be performed, e.g., by the multiplexed UCI reception component 2450 of the network entity 2402 in FIG. 24. The network entity may de-multiplex the UCI, e.g., as illustrated at 2030 in FIG. 20.

The UCI may be multiplexed based on any of the aspects described herein, e.g., based on any of the examples in Table 1 or Table 2.

The multiple slot PUSCH transmission may include a transmission occasion comprising a set of contiguous slots, such as described in connection with option (a) in FIG. 4, or as described in connection with FIG. 9. FIGS. 10-17 illustrate various example aspects of UCI multiplexed with a multiple slot PUSCH in a transmission occasion having contiguous resources.

In some aspects the UCI may be multiplexed in a single slot of the multiple slot PUSCH transmission based on the UCI overlapping in time with the single slot, e.g., as described in connection with any of FIG. 10, 12, or 13. In some aspects, the UCI may be multiplexed based on a multiplexing timeline based on a slot of the multiple slot PUSCH transmission that overlaps in time with the UCI. In some aspects, the multiple slot PUSCH transmission may be rate matched and interleaved per slot. FIG. 7 illustrates an example of interleaving per slot. The network entity may perform a corresponding de-interleaving to receive the transmission.

In some aspects, the multiplexed UCI may be based on a multiplexing timeline that is based on a first slot of the transmission occasion of the multiple slot PUSCH. The multiple slot PUSCH transmission may be rate matched and interleaved per transmission occasion. FIG. 6 illustrates an example of interleaving per transmission occasion. The network entity may perform a corresponding de-interleaving to receive the transmission.

In some aspects, the UCI may be multiplexed in a first slot of the multiple slot PUSCH transmission, e.g., in a number of resources in the first slot where the number of resources is determined at least in part on the number of resource elements available for the UCI across a first number of PUSCH symbols in the first slot. In some aspects, the UCI may be multiplexed in a first slot of the multiple slot PUSCH transmission, and multiplexing the UCI further includes multiplexing the UCI in a number of resources in the first slot where the number of resources is determined at least in part on a scaled number of PUSCH bits where the scaled number of PUSCH bits is obtained by multiplying the total of PUSCH bits by the ratio of number of resource elements available for the UCI across a first number of PUSCH symbols in the first slot to the number of resource elements available for the UCI across a second number of PUSCH symbols in the transmission occasion of the multiple slot PUSCH transmission. For example, the number of resources for the UCI may be based on the description in connection with equation 1 and FIG. 10.

The UCI payload may include HARQ ACK/NACK bits, and the UCI may be received in a location in a first symbol following a demodulation reference signal in a first slot allocated for the multiple slot PUSCH transmission. The UCI payload may comprise channel state information (CSI), and the UCI may be received in a location based on the first symbol of a first slot allocated for the multiple slot PUSCH transmission.

In some aspects, the UCI may be multiplexed over the set of contiguous slots of the transmission occasion, e.g., in a single slot of the multiple slot PUSCH transmission.

In some aspects, the UCI may be received in resources spanning multiple slots of the multiple slot PUSCH transmission. FIG. 11 illustrates an example of the UCI spanning multiple slots of the transmission occasion. The UCI may be multiplexed in a number of resources in a first slot based on a number of resource elements available for the UCI across a first number of PUSCH symbols in the multiple slot PUSCH transmission divided by a total number of PUSCH bits. For example, the number of resources for the UCI may be based on the description in connection with equation 1 and FIG. 11.

In some aspects, the UCI may be multiplexed in a single slot of the multiple slot PUSCH transmission and in a number of resources in the single slot based on a number of resource elements available for the UCI across a first number of PUSCH symbols in the single slot divided by a total number of scaled PUSCH bits, the scaled PUSCH bits being scaled by the first number of PUSCH symbols in the single slot divided by a second number of the PUSCH symbols across the transmission occasion of the multiple slot PUSCH transmission. For example, the number of resources for the UCI may be based on the description in connection with equation 1 and FIG. 12.

In some aspects, the UCI may overlap in time with a slot after a first slot of the multiple slot PUSCH transmission and may be multiplexed within the first slot of the multiple slot PUSCH transmission, e.g., as described in connection with any of the aspects of FIG. 13.

In some aspects, the UCI may be multiplexed with a repetition in each slot of the transmission occasion. FIG. 14 illustrates an example of the repetition of multiplexed UCI.

In some aspects, multiple PUCCHs may be multiplexed in the PUSCH. For example, the PUSCH transmission received by the network entity may include a first UCI and a second UCI that overlap with the multiple slot PUSCH transmission. The first UCI and the second UCI may be multiplexed on a per slot basis, e.g., as described in connection with the example in FIG. 16. The first UCI and the second UCI may overlap in different slots of the transmission occasion, and may be multiplexed within the different slots of the multiple slot PUSCH transmission, e.g., as described in connection with FIG. 17. In some aspects, the PUSCH may be rate matched for the per slot of the transmission occasion, and the network entity may perform a corresponding de-rate matching in order to receive the PUSCH. In some aspects, the PUSCH transmission may be interleaved per slot of the transmission occasion, e.g., as illustrated in the example in FIG. 6. The network entity may perform a corresponding de-interleaving to receive the UCI. The first UCI and the second UCI may be multiplexed across the contiguous slots of the transmission occasion. The first UCI and the second UCI may overlap in different slots of the transmission occasion, and the first UCI and the second UCI may be jointly multiplexed in the multiple slot PUSCH transmission.

In some aspects, the PUSCH transmission may be rate matched across the multiple slots of the transmission occasion, and the network entity may perform a corresponding de-rate matching to receive the PUSCH.

In some aspects, the multiple slot PUSCH transmission may be received in a transmission occasion comprising a set of non-contiguous slots, e.g., as described in connection with option (b) in FIG. 4 and/or as described in connection with FIGS. 18 and/or 19. The UCI may be multiplexed in a single slot of the multiple slot PUSCH transmission based on the UCI overlapping in time with the single slot. The UCI may be multiplexed over the set of non-contiguous slots of the transmission occasion. The set of non-contiguous slots may comprise multiple contiguous portions, and the UCI may be multiplexed over a contiguous portion of the transmission occasion. The UCI may be multiplexed within the contiguous portion with which the UCI overlaps in time. The UCI may be multiplexed based on a multiplexing timeline based on a slot of the contiguous portion that overlaps in time with the UCI. The multiplexing timeline may be based on a first slot of the contiguous portion. The resources for transmission of the UCI may be based on the contiguous portion. The UCI may be multiplexed in at least one slot of the contiguous portion of the transmission occasion, and multiplexing the UCI may further include multiplexing the UCI in a number of resources in the contiguous portion where a number of resources is determined based at least in part on a number of resource elements available for the UCI across a first number of PUSCH symbols in the contiguous portion. In some aspects, the UCI may be received in a number of resources in the contiguous portion where the number of resources is determined based at least in part on a scaled number of PUSCH bits, where the scaled PUSCH bits are obtained by multiplying a total of PUSCH bits by the ratio of the first number of PUSCH symbols in the contiguous portion divided by a second number of the PUSCH symbols across the transmission occasion of the multiple slot PUSCH transmission.

Figure 24:
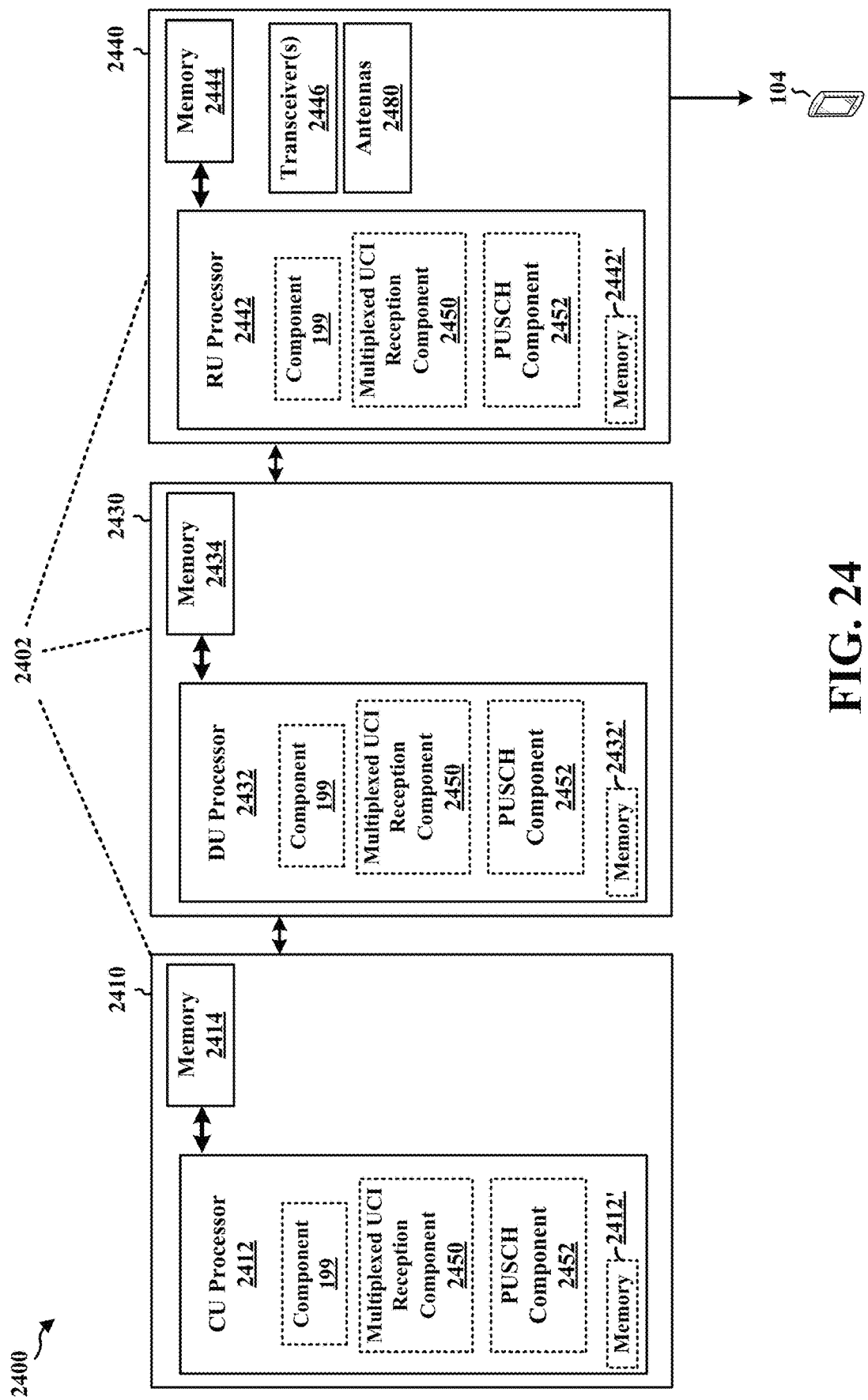
FIG. 24 is a diagram illustrating an example of a hardware implementation for an example apparatus.

FIG. 24 is a diagram 2400 illustrating an example of a hardware implementation for a network entity 2402. The network entity 2402 may be a BS, a component of a BS, or may implement BS functionality. The network entity 2402 may include at least one of a CU 2410, a DU 2430, or an RU 2440. For example, depending on the layer functionality handled by the component 199, the network entity 2402 may include the CU 2410; both the CU 2410 and the DU 2430; each of the CU 2410, the DU 2430, and the RU 2440; the DU 2430; both the DU 2430 and the RU 2440; or the RU 2440. The CU 2410 may include a CU processor 2412. The CU processor 2412 may include on-chip memory 2412'. In some aspects, the CU 2410 may further include additional memory modules 2414. The CU 2410 communicates with the DU 2430. The DU 2430 may include a DU processor 2432. The DU processor 2432 may include on-chip memory 2432'. In some aspects, the DU 2430 may further include additional memory modules 2434. The DU 2430 communicates with the RU 2440. The RU 2440 may include an RU processor 2442. The RU processor 2442 may include on-chip memory 2442'. In some aspects, the RU 2440 may further include additional memory modules 2444, one or more transceivers 2446, and antennas 2480. The RU 2440 communicates with the UE 104. The on-chip memory 2412', 2432', 2442' and the additional memory modules 2414, 2434, 2444 may each be considered a computer-readable medium/memory. Each computer-readable medium/memory may be non-transitory. Each of the processors 2412, 2432, 2442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

The network entity 2402 includes a multiplexed UCI reception component 2450 that is configured to receive the multiple slot PUSCH transmission comprising UCI multiplexed in at least one slot of the multiple slot PUSCH transmission, e.g., as described in connection with 2304 in FIG. 23. The network entity 2402 further includes a PUSCH component 2452 that is configured to allocate resources to a UE for a multiple slot PUSCH transmission, e.g., as described in connection with 2302 in FIG. 23.

As discussed supra, the component 199 is configured to receive the multiple slot PUSCH transmission comprising UCI multiplexed in at least one slot of the multiple slot PUSCH transmission and to allocate resources to a UE for a multiple slot PUSCH transmission. The component 199 may be within one or more processors of one or more of the CU 2410, DU 2430, and the RU 2440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2402 may include a variety of components configured for various functions. In one configuration, the network entity 2402 includes means for receiving the multiple slot PUSCH transmission comprising UCI multiplexed in at least one slot of the multiple slot PUSCH transmission and allocating resources to a UE for a multiple slot PUSCH transmission. The means may be the component 199 of the network entity 2402 configured to perform the functions recited by the means. As described supra, the network entity 2402 may include the TX processor 316, the RX processor 370, and the controller/processor 375. As such, in one configuration, the means may be the TX processor 316, the RX processor 370, and/or the controller/processor 375 configured to perform the functions recited by the means.

The apparatus may include additional components that perform each of the blocks of the algorithm in the flowchart of FIG. 23 and/or the aspects performed by the network entity in FIG. 20. As such, each block in the flowchart of FIG. 23 and/or the aspects performed by the network entity in FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: multiplexing UCI in a segment a multiple slot PUSCH transmission, the UCI multiplexing based on at least one of: a slot within a multiple slot transmission occasion, a segment of the multiple slot transmission occasion, or the multiple slot transmission occasion; and transmitting the multiple slot PUSCH transmission with multiplexed UCI.

In aspect 2, the method of aspect 1 further includes that the multiple slot PUSCH transmission is transmitted in a transmission occasion comprising a set of contiguous slots.

In aspect 3, the method of aspect 1 or aspect 2 further includes that the UCI is multiplexed in a single slot of the multiple slot PUSCH transmission based on the UCI overlapping in time with the single slot.

In aspect 4, the method of any of aspects 1-3, further comprises: rate matching and interleaving the multiple slot PUSCH transmission per slot.

In aspect 5, the method of any of aspects 1-4, further comprises enabling redundancy version cycling per slot for the multiple slot PUSCH transmission.

In aspect 6, the method of any of aspects 1-3, further comprises: rate matching and interleaving the multiple slot PUSCH transmission per transmission occasion.

In aspect 7, the method of any of aspects 1-3 or 6, further comprises: enabling redundancy version cycling per transmission occasion for the multiple slot PUSCH transmission.

In aspect 8, the method of any of aspects 1-7, wherein the UCI is multiplexed in a first slot of the multiple slot PUSCH transmission, and multiplexing the UCI further includes multiplexing the UCI in a number of resources in the first slot where the number of resources is determined at least in part on a number of resource elements available for the UCI across a first number of PUSCH symbols in the first slot.

In aspect 9, the method of any of aspects 1-8, wherein the UCI is multiplexed in a first slot of the multiple slot PUSCH transmission, and multiplexing the UCI further includes multiplexing the UCI in a number of resources in the first slot where the number of resources is determined at least in part on a scaled number of PUSCH bits where the scaled number of PUSCH bits is obtained by multiplying a total number of PUSCH bits by a ratio of a number of resource elements available for the UCI across a first number of PUSCH symbols in the first slot to the number of resource elements available for the UCI across a second number of PUSCH symbols in a transmission occasion of the multiple slot PUSCH transmission.

In aspect 10, the method of any of aspects 1-9, wherein a UCI payload comprises HARQ ACK/NACK bits, and the UCI has a location in a first symbol following a demodulation reference signal in a first slot allocated for the multiple slot PUSCH transmission.

In aspect 11, the method of any of aspects 1-9, wherein a UCI payload comprises CSI, and the UCI has a location based on a first symbol of a first slot allocated for the multiple slot PUSCH transmission.

In aspect 12, the method of any of aspects 1-3 or 6-11 further includes that the UCI is multiplexed over a transmission occasion.

In aspect 13, the method of aspect 12 further includes that the UCI is transmitted in resources comprised in a single slot of the multiple slot PUSCH transmission.

In aspect 14, the method of aspect 12 further includes that the UCI is transmitted in resources spanning multiple slots of the multiple slot PUSCH transmission.

In aspect 15, the method of any of aspects 12-14 further includes that, wherein multiplexing the UCI further includes: multiplexing the UCI in a number of resources based on a number of resource elements available for the UCI across a first number of PUSCH symbols in the multiple slot PUSCH transmission divided by a total number of PUSCH bits.

In aspect 16, the method of aspect 15 further includes that the UCI overlaps in time with a slot after a first slot of the multiple slot PUSCH transmission and is multiplexed within the first slot of the multiple slot PUSCH transmission.

In aspect 17, the method of any of aspects 1-16 further includes that the UCI is multiplexed with a repetition in each slot of the multiple slot transmission occasion.

In aspect 18, the method of any of aspects 1-16 further includes multiplexing a first UCI and a second UCI that overlap with the multiple slot PUSCH transmission.

In aspect 19, the method of aspect 18 further includes that the first UCI and the second UCI are multiplexed on a per slot basis.

In aspect 20, the method of aspect 18 or 19 further includes that the first UCI and the second UCI overlap in different slots of the multiple slot transmission occasion, and are multiplexed within the different slots of the multiple slot PUSCH transmission.

In aspect 21, the method of aspect 18 or 19 further includes performing rate matching for the PUSCH transmission per slot of the multiple slot transmission occasion.

In aspect 22, the method of any of aspects 18-21 further includes carrying over a starting position in a circular buffer from a first slot to a second slot.

In aspect 23, the method of any of aspects 18-22 further includes that interleaving the PUSCH transmission per slot of the multiple slot transmission occasion.

In aspect 24, the method of aspect 18 or 19 further includes that the first UCI and the second UCI are multiplexed across contiguous slots of the multiple slot transmission occasion.

In aspect 25, the method of aspect 24 further includes that the first UCI and the second UCI overlap in different slots of the multiple slot transmission occasion, and wherein the first UCI and the second UCI are jointly multiplexed in the multiple slot PUSCH transmission.

In aspect 26, the method of aspect 24 or 25 further includes performing rate matching and interleaving for the multiple slot PUSCH transmission across the multiple slots of the multiple slot transmission occasion.

In aspect 27, the method of any of aspects 1 or 3-26 further includes that the multiple slot PUSCH transmission is transmitted in a transmission occasion comprising a set of non-contiguous slots.

In aspect 28, the method of aspect 27 further includes that the UCI is multiplexed in a single slot of the multiple slot PUSCH transmission based on the UCI overlapping in time with the single slot.

In aspect 29, the method of aspect 27 further includes that the UCI is multiplexed over the set of non-contiguous slots of the transmission occasion.

In aspect 30, the method of aspect 27 further includes that the set of non-contiguous slots comprises multiple contiguous portions, and the UCI is multiplexed over a contiguous portion of the transmission occasion.

In aspect 31, the method of aspect 30 further includes that the UCI is multiplexed within the contiguous portion with which the UCI overlaps in time.

In aspect 32, the method of aspect 30 or 31 further includes that resources for transmission of the UCI are based on the contiguous portion.

In aspect 33, the method of aspect 32 further includes that the UCI is multiplexed in at least one slot of the contiguous portion of the transmission occasion, and multiplexing the UCI further includes multiplexing the UCI in a number of resources in the contiguous portion where the number of resources is determined based at least in part on a number of resource elements available for the UCI across a first number of PUSCH symbols in the contiguous portion.

In aspect 34, the method of aspect 32 or 33 further includes that the UCI is multiplexed in at least one slot of the contiguous portion of the transmission occasion, and multiplexing the UCI further includes: multiplexing the UCI in a number of resources in the contiguous portion where the number of resources is determined based at least in part on a scaled number of PUSCH bits, where the scaled number of PUSCH bits is obtained by multiplying a total number of PUSCH bits by a ratio of a first number of PUSCH symbols in the contiguous portion divided by a second number of PUSCH symbols across the transmission occasion of the multiple slot PUSCH transmission.

Aspect 35 is an apparatus for wireless communication at a UE, comprising: a memory; and at least one processor coupled to the memory and configured to: multiplex UCI in at least one slot of a multiple slot PUSCH transmission, the UCI multiplexing based on at least one of: a slot within a multiple slot transmission occasion, a segment of the multiple slot transmission occasion, or the multiple slot transmission occasion; and transmitting the multiple slot PUSCH transmission with multiplexed UCI.

In aspect 36, the apparatus for wireless communication of aspect 35, in which the memory and the at least one processor are further configured to perform the method of any of aspects 2-34.

Aspect 37 is an apparatus for wireless communication at a UE, comprising: means for multiplexing UCI in at least one slot of a multiple slot PUSCH transmission, the UCI multiplexing based on at least one of: a slot within a multiple slot transmission occasion, a segment of the multiple slot transmission occasion, or the multiple slot transmission occasion; and transmitting the multiple slot PUSCH transmission with multiplexed UCI.

In aspect 38, the apparatus for wireless communication of aspect 37, further comprises means to perform the method of any of aspects 2-34.

Aspect 39 is a computer-readable medium storing computer executable code at a user equipment (UE), the code when executed by a processor causes the processor to: multiplex UCI in at least one slot of a multiple slot PUSCH transmission, the UCI multiplexing based on at least one of: a slot within a multiple slot transmission occasion, a segment of the multiple slot transmission occasion, or the multiple slot transmission occasion; and transmitting the multiple slot PUSCH transmission with multiplexed UCI.

In aspect 40, the computer-readable medium of aspect 39, wherein the code when executed by the processor causes the processor to perform the method of any of aspects 2-34.

Aspect 41 is a method of wireless communication at a network entity, comprising: allocating resources to a UE for a multiple slot PUSCH transmission; and receiving the multiple slot PUSCH transmission comprising UCI multiplexed in a segment of the multiple slot PUSCH transmission, the UCI multiplexed based on at least one of: a slot within a multiple slot transmission occasion, a segment of the multiple slot transmission occasion, or the multiple slot transmission occasion.

In aspect 42, method of aspect 41 further includes that the multiple slot PUSCH transmission is received in a transmission occasion comprising a set of contiguous slots.

In aspect 43, the method of any of aspects 41 or 42 further includes that the UCI is multiplexed in a single slot of the multiple slot PUSCH transmission.

In aspect 44, the method of any of aspects 41-43, further comprises de-rate matching and de-interleaving the multiple slot PUSCH transmission per slot.

In aspect 45, the method of any of aspects 41-44, further includes that the multiple slot PUSCH transmission is received based on redundancy version cycling per slot for the multiple slot PUSCH transmission.

In aspect 46, the method of any of aspects 41-43 further comprises de-rate matching and de-interleaving the multiple slot PUSCH transmission per transmission occasion.

In aspect 47, the method of any of aspects 41-43 and 46 further includes that the multiple slot PUSCH transmission is received based on redundancy version cycling per transmission occasion for the multiple slot PUSCH transmission.

In aspect 48, the method of any of aspects 41-47 further includes that the UCI is multiplexed in a first slot of the multiple slot PUSCH transmission in a number of resources in the first slot based at least in part on a number of resource elements available for the UCI across a first number of PUSCH symbols in the first slot.

In aspect 49, the method of any of aspects 41-48 further includes that the UCI is multiplexed in a number of resources in the first slot based at least in part on a scaled number of PUSCH bits where the scaled number of PUSCH bits is obtained by multiplying a total number of PUSCH bits by a ratio of a number of resource elements available for the UCI across a first number of PUSCH symbols in the first slot to the number of resource elements available for the UCI across a second number of PUSCH symbols in a transmission occasion of the multiple slot PUSCH transmission.

In aspect 50, the method of any of aspects 41-49 further includes that a UCI payload comprises HARQ ACK/NACK bits, and the UCI has a location in a first symbol following a demodulation reference signal in a first slot allocated for the multiple slot PUSCH transmission.

In aspect 51, the method of any of aspects 41-49 further includes that a UCI payload comprises CSI, and the UCI has a location based on a first symbol of a first slot allocated for the multiple slot PUSCH transmission.

In aspect 52, the method of any of aspects 41 or 42 further includes that the UCI received by the network entity is multiplexed over a transmission occasion.

In aspect 53, the method of any of aspects 41, 42, or 52 further includes that the UCI is received in resources comprised in a single slot of the multiple slot PUSCH transmission.

In aspect 54, the method of any of aspects 41, 42, or 52 further includes that the UCI is received in resources spanning multiple slots of the multiple slot PUS CH transmission.

In aspect 55, the of any of aspects 41, 42, 52 or 54 further includes that multiplexed UCI is received in a number of resources based on a number of resource elements available for the UCI across a first number of PUSCH symbols in the multiple slot PUSCH transmission divided by a total number of PUSCH bits.

In aspect 56, the method of any of aspects 41, 42, 52, 54, or 55 further includes that the UCI overlaps in time with a slot after a first slot of the multiple slot PUSCH transmission and is received within the first slot of the multiple slot PUSCH transmission.

In aspect 57, the method of any of aspects 41-56 further includes that the UCI is received with a repetition in each slot of the multiple slot transmission occasion.

In aspect 58, the method of any of aspects 41-57 further includes that the network entity receives a first UCI and a second UCI that are multiplexed with the multiple slot PUSCH transmission.

In aspect 59, the method of aspect 58 further includes that the first UCI and the second UCI are multiplexed on a per slot basis.

In aspect 60, the method of aspect 58 or 59 further includes that the first UCI and the second UCI overlap in different slots of the multiple slot transmission occasion, and are multiplexed within the different slots of the multiple slot PUSCH transmission.

In aspect 61, the method of aspect 58 or 59, further includes performing de-rate matching for the PUSCH transmission per slot of the multiple slot transmission occasion.

In aspect 62, the method of aspect 58 or 59, further includes de-interleaving the PUSCH transmission per slot of the multiple slot transmission occasion.

In aspect 63, the method of aspect 58 further includes that the first UCI and the second UCI are multiplexed across contiguous slots of the multiple slot transmission occasion.

In aspect 64, the method of aspect 58 or 63 further includes that the first UCI and the second UCI overlap in different slots of the multiple slot transmission occasion, and wherein the first UCI and the second UCI received by the network entity are jointly multiplexed in the multiple slot PUSCH transmission.

In aspect 65, the method of any of aspects 58, 63, or 64, further includes performing de-rate matching and de-interleaving of the multiple slot PUSCH transmission across the multiple slots of the multiple slot transmission occasion.

In aspect 66, method of aspect 41 or 43-65 further includes that the multiple slot PUSCH transmission is received in a transmission occasion comprising a set of non-contiguous slots.

In aspect 67, the method of aspect 66 further includes that the UCI is multiplexed in a single slot of the multiple slot PUSCH transmission.

In aspect 68, the method of aspect 66 further includes that the UCI is multiplexed over the set of non-contiguous slots of the transmission occasion.

In aspect 69, the method of aspect 66 further includes that the set of non-contiguous slots comprises multiple contiguous portions, and the UCI is multiplexed over a contiguous portion of the transmission occasion.

In aspect 70, the method of aspect 69 further includes that the UCI is multiplexed within the contiguous portion with which the UCI overlaps in time.

In aspect 71, the method of aspect 69 or 70 further includes that resources for transmission of the UCI are based on the contiguous portion.

In aspect 72, the method of any of aspects 69-71 further includes that the UCI is multiplexed in at least one slot of the contiguous portion of the transmission occasion in a number of resources based at least in part on a number of resource elements available for the UCI across a first number of PUSCH symbols in the contiguous portion.

In aspect 73, the method of any of aspects 69-72 further includes that the UCI is multiplexed in at least one slot of the contiguous portion of the transmission occasion in a number of resources in the contiguous portion based at least in part on a scaled number of PUSCH bits, where the scaled number of PUSCH bits is obtained by multiplying a total number of PUSCH bits by a ratio of a first number of PUSCH symbols in the contiguous portion divided by a second number of PUSCH symbols across the transmission occasion of the multiple slot PUSCH transmission.

Aspect 74 is an apparatus for wireless communication at a network entity, comprising: a memory; and at least one processor coupled to the memory and configured to: allocate resources to a UE for a multiple slot PUSCH transmission; and receive the multiple slot PUSCH transmission comprising UCI multiplexed in a segment of the multiple slot PUSCH transmission, the UCI multiplexed based on at least one of: a slot within a multiple slot transmission occasion, a segment of the multiple slot transmission occasion, or the multiple slot transmission occasion.

In aspect 75, the apparatus for wireless communication of aspect 74, comprises the memory and the at least one processor that are further configured to perform the method of any of any of aspects 42-73.

Aspect 76 is an apparatus for wireless communication at a network entity, comprising: means for allocating resources to a UE for a multiple slot PUSCH transmission; and means for receiving the multiple slot PUSCH transmission comprising UCI multiplexed in a segment of the multiple slot PUSCH transmission, the UCI multiplexed based on at least one of: a slot within a multiple slot transmission occasion, a segment of the multiple slot transmission occasion, or the multiple slot transmission occasion.

In aspect 77, the apparatus for wireless communication of aspect 76, further comprises means to perform the method of any of aspects 42-73.

Aspect 78 is a non-transitory computer-readable medium storing computer executable code at a network entity, the code when executed by a processor causes the processor to: allocate resources to a UE for a multiple slot PUSCH transmission; and receive the multiple slot PUSCH transmission comprising UCI multiplexed in a segment of the multiple slot PUSCH transmission, the UCI multiplexed based on at least one of: a slot within a multiple slot transmission occasion, a segment of the multiple slot transmission occasion, or the multiple slot transmission occasion.

In aspect 79, the computer-readable medium of aspect 78 further includes code that when executed by the processor causes the processor to perform the method of any of aspects 42-73.

What is claimed is:

1. An apparatus for wireless communication at a user equipment (UE), comprising:
   memory; and
   at least one processor coupled to the memory and configured to:
      multiplex uplink control information (UCI) in a segment of a multiple slot physical uplink shared channel (PUSCH) transmission, wherein the UCI is multiplexed within
         a slot within a multiple slot transmission occasion and in a number of resources in the slot, where the number of resources is determined at least in part on a number of resource elements available for the UCI across a first number of PUSCH symbols in the slot; and
      transmit the multiple slot PUSCH transmission with multiplexed UCI.

2. The apparatus of claim 1, wherein the at least one processor is configured to multiplex the UCI in a single slot of the multiple slot PUSCH transmission based on the UCI overlapping in time with the single slot.

3. The apparatus of claim 2, wherein the at least one processor is further configured to:
   rate match and interleave the multiple slot PUSCH transmission per slot.

4. The apparatus of claim 2, wherein the at least one processor is further configured to:
   enable redundancy version cycling per slot for the multiple slot PUSCH transmission.

5. The apparatus of claim 2, wherein the number of resources is determined at least in part on a scaled number of PUSCH bits where the scaled number of PUSCH bits is obtained by multiplying a total number of PUSCH bits by a ratio of the number of resource elements available for the UCI across the first number of PUSCH symbols in the slot to the number of resource elements available for the UCI across a second number of PUSCH symbols in a transmission occasion of the multiple slot PUSCH transmission.

6. The apparatus of claim 2, wherein the at least one processor is further configured to:
   rate match and interleave the multiple slot PUSCH transmission per transmission occasion, or
   enable redundancy version cycling per transmission occasion for the multiple slot PUSCH transmission.

7. The apparatus of claim 2, wherein the slot is a first slot of the multiple slot PUSCH transmission.

8. The apparatus of claim 2, wherein a UCI payload comprises hybrid automatic repeat request (HARQ) ACK/NACK bits, and the UCI has a location in a first symbol following a demodulation reference signal in a first slot allocated for the multiple slot PUSCH transmission.

9. The apparatus of claim 2, wherein a UCI payload comprises channel state information (CSI), and the UCI has a location based on a first symbol of a first slot allocated for the multiple slot PUSCH transmission.

10. The apparatus of claim 1, wherein the at least one processor is configured to transmit the UCI in resources comprised in a single slot of the multiple slot PUSCH transmission.

11. An apparatus for wireless communication at a user equipment (UE), comprising:
    memory; and
    at least one processor coupled to the memory and configured to:
       multiplex uplink control information (UCI) in a segment of a multiple slot physical uplink shared channel (PUSCH) transmission, wherein the UCI is multiplexed within a multiple slot transmission occasion over a transmission occasion and in a number of resources based on a number of resource elements available for the UCI across a first number of PUSCH symbols in the multiple slot PUSCH transmission divided by a total number of PUSCH bits, wherein the UCI overlaps in time with a slot after a first slot of the multiple slot PUSCH transmission and is multiplexed within the first slot of the multiple slot PUSCH transmission; and
       transmit the multiple slot PUSCH transmission with multiplexed UCI.

12. The apparatus of claim 11, wherein the UCI is multiplexed with a repetition in each slot of the multiple slot transmission occasion.

13. The apparatus of claim 1, wherein to multiplex the UCI, the at least one processor is configured to:
    multiplex a first UCI and a second UCI that overlap with the multiple slot PUSCH transmission on a per slot basis.

14. The apparatus of claim 13, wherein the first UCI and the second UCI overlap in different slots of the multiple slot transmission occasion, and are multiplexed within the different slots of the multiple slot PUSCH transmission.

15. The apparatus of claim 13, wherein the at least one processor is further configured to:
    perform rate matching for the PUSCH transmission per slot of the multiple slot transmission occasion.

16. The apparatus of claim 13, wherein the at least one processor is further configured to:
    interleave the PUSCH transmission per slot of the multiple slot transmission occasion.

17. The apparatus of claim 1, wherein the at least one processor is configured to:
    multiplex a first UCI and a second UCI that overlap with the multiple slot PUSCH transmission, wherein the first UCI and the second UCI are multiplexed across contiguous slots of the multiple slot transmission occasion, wherein the first UCI and the second UCI overlap in different slots of the multiple slot transmission occasion, and wherein the first UCI and the second UCI are jointly multiplexed in the multiple slot PUSCH transmission; and
    perform rate matching and interleaving for the multiple slot PUSCH transmission across multiple slots of the multiple slot transmission occasion.

18. The apparatus of claim 1, wherein the at least one processor is configured to transmit the multiple slot PUSCH transmission in a transmission occasion comprising a set of non-contiguous slots, and to multiplex the UCI in a single slot of the multiple slot PUSCH transmission based on the UCI overlapping in time with the single slot.

19. An apparatus for wireless communication at a user equipment (UE), comprising:
    memory; and
    at least one processor coupled to the memory and configured to:
       multiplex uplink control information (UCI) in a segment of a multiple slot physical uplink shared channel (PUSCH) transmission, wherein the UCI is multiplexed in at least one slot of a contiguous portion of a transmission occasion, and wherein resources for transmission of the UCI are based on the contiguous portion, and a number of resources is determined based at least in part on one or more of:
a number of resource elements available for the UCI across a first number of PUSCH symbols in the contiguous portion, or
a scaled number of PUSCH bits, where the scaled number of PUSCH bits is obtained by multiplying a total number of PUSCH bits by a ratio of the first number of PUSCH symbols in the contiguous portion divided by a second number of PUSCH symbols across the transmission occasion of the multiple slot PUSCH transmission; and
transmit the multiple slot PUSCH transmission with multiplexed UCI, wherein the multiple slot PUSCH transmission is transmitted in the transmission occasion comprising a set of non-contiguous slots, and the set of non-contiguous slots comprises multiple contiguous portions.

20. The apparatus of claim 19, wherein to multiplex the UCI, the at least one processor is configured to:
multiplex the UCI in the number of resources in the contiguous portion, where the number of resources is determined based at least in part on the number of resource elements available for the UCI across the first number of PUSCH symbols in the contiguous portion.

21. The apparatus of claim 20, wherein the UCI is multiplexed within the contiguous portion with which the UCI overlaps in time.

22. The apparatus of claim 19, wherein to multiplex the UCI, the at least one processor is configured to:
multiplex the UCI in the number of resources in the contiguous portion where the number of resources is determined based at least in part on the scaled number of PUSCH bits, where the scaled number of PUSCH bits is obtained by multiplying the total number of PUSCH bits by the ratio of the first number of PUSCH symbols in the contiguous portion divided by the second number of PUSCH symbols across the transmission occasion of the multiple slot PUSCH transmission.

23. The apparatus of claim 1, wherein the at least one processor is configured to transmit the multiple slot PUSCH transmission in a transmission occasion comprising a set of contiguous slots.

24. A method of wireless communication at a user equipment (UE), comprising:
multiplexing uplink control information (UCI) in a segment of a multiple slot physical uplink shared channel (PUSCH) transmission, wherein the UCI is multiplexed within a slot within a multiple slot transmission occasion and in a number of resources in the slot, where the number of resources is determined at least in part on a number of resource elements available for the UCI across a first number of PUSCH symbols in the slot; and,
transmitting the multiple slot PUSCH transmission with multiplexed UCI.

25. An apparatus for wireless communication at a network entity, comprising:
memory; and
at least one processor coupled to the memory and configured to:
allocate resources to a user equipment (UE) for a multiple slot physical uplink shared channel (PUSCH) transmission; and
receive the multiple slot PUSCH transmission comprising uplink control information (UCI) multiplexed in a segment of the multiple slot PUSCH transmission, wherein the UCI is multiplexed in a slot within a multiple slot transmission occasion and in a number of resources in the slot, where the number of resources is determined at least in part on a number of resource elements available for the UCI across a first number of PUSCH symbols in the slot.

26. The apparatus of claim 25, wherein the UCI is multiplexed in a single slot of the multiple slot PUSCH transmission, and the at least one processor is configured to:
de-rate matching and de-interleaving the multiple slot PUSCH transmission per slot, or
receive the multiple slot PUSCH transmission based on redundancy version cycling per slot for the multiple slot PUSCH transmission.

27. A method of wireless communication at a network entity, comprising:
allocating resources to a user equipment (UE) for a multiple slot physical uplink shared channel (PUSCH) transmission; and
receiving the multiple slot PUSCH transmission comprising uplink control information (UCI) multiplexed in a segment of the multiple slot PUSCH transmission, wherein the UCI is multiplexed in a slot within a multiple slot transmission occasion and in a number of resources in the slot, where the number of resources is determined at least in part on a number of resource elements available for the UCI across a first number of PUSCH symbols in the slot.

28. The apparatus of claim 15, wherein the at least one processor is further configured to:
carry over a starting position in a circular buffer from a first slot to a second slot.

29. The method of claim 24, wherein the UCI is multiplexed in a single slot of the multiple slot PUSCH transmission based on the UCI overlapping in time with the single slot.

30. The method of claim 29, further comprising:
rate matching and interleaving the multiple slot PUSCH transmission per slot.

31. The method of claim 29, further comprising:
enabling redundancy version cycling per slot for the multiple slot PUSCH transmission.

32. The method of claim 29, wherein the number of resources is determined at least in part on a scaled number of PUSCH bits where the scaled number of PUSCH bits is obtained by multiplying a total number of PUSCH bits by a ratio of the number of resource elements available for the UCI across the first number of PUSCH symbols in the slot to the number of resource elements available for the UCI across a second number of PUSCH symbols in a transmission occasion of the multiple slot PUSCH transmission.

33. The method of claim 24, wherein multiplexing the UCI includes:
multiplexing a first UCI and a second UCI that overlap with the multiple slot PUSCH transmission on a per slot basis.

* * * * *